(12) United States Patent
Mankowski

(10) Patent No.: US 8,994,845 B2
(45) Date of Patent: Mar. 31, 2015

(54) SYSTEM AND METHOD OF ADJUSTING A CAMERA BASED ON IMAGE DATA

(75) Inventor: Peter Mankowski, Waterloo (CA)

(73) Assignee: BlackBerry Limited, Waterloo, ON (CA)

( * ) Notice: Subject to any disclaimer, the term of this patent is extended or adjusted under 35 U.S.C. 154(b) by 323 days.

(21) Appl. No.: 13/458,595

(22) Filed: Apr. 27, 2012

(65) Prior Publication Data

US 2013/0286236 A1  Oct. 31, 2013

(51) Int. Cl.
*H04N 5/228* (2006.01)
*H04N 5/232* (2006.01)
*H04N 5/33* (2006.01)

(52) U.S. Cl.
CPC ........ *H04N 5/23222* (2013.01); *H04N 5/23232* (2013.01); *H04N 5/332* (2013.01)
USPC ...................................... 348/222.1

(58) Field of Classification Search
USPC ................................ 348/162, 164
See application file for complete search history.

(56) References Cited

U.S. PATENT DOCUMENTS

| | | | | |
|---|---|---|---|---|
| 4,967,276 | A * | 10/1990 | Murakami et al. | 348/164 |
| 7,199,366 | B2 * | 4/2007 | Hahn et al. | 250/330 |
| 8,279,285 | B2 * | 10/2012 | Imai | 348/162 |
| 8,565,547 | B2 * | 10/2013 | Strandemar | 382/263 |
| 8,717,464 | B2 * | 5/2014 | Tang | 348/241 |
| 2007/0003155 | A1 | 1/2007 | Miller et al. | |
| 2008/0024608 | A1 * | 1/2008 | Hahn et al. | 348/148 |
| 2010/0201823 | A1 | 8/2010 | Zhang et al. | |
| 2010/0289885 | A1 * | 11/2010 | Lu et al. | 348/61 |
| 2010/0309315 | A1 | 12/2010 | Hogasten et al. | |
| 2011/0293179 | A1 * | 12/2011 | Dikmen et al. | 382/167 |

FOREIGN PATENT DOCUMENTS

WO        0213535 A2    2/2002

OTHER PUBLICATIONS

Extended European Search report mailed on Sep. 13, 2012, in corresponding European patent application No. 12166043.5.
Office Action mailed Feb. 7, 2014; in corresponding Canadian patent application No. 2,776,009.
Examination Report mailed May 23, 2014; in corresponding European patent application No. 12166043.5.

* cited by examiner

*Primary Examiner* — Gary C Vieaux
(74) *Attorney, Agent, or Firm* — Fish & Richardson P.C.

(57) ABSTRACT

Systems and methods of adjusting camera image data include receiving image data from a visible light camera module are described. A quality factor of the image data can be determined based on at least one predetermined characteristic. The quality factor can be compared to a predetermined threshold. Image data from a non-visible light camera module can be requested when the quality factor is below the predetermined threshold. Image data from the non-visible light camera module can be received in response to the request. The received image data from the visible light camera module can be augmented with the received image data from the non-visible light camera module to form hybrid image data. The image sensor can be adjusted based on a quality factor of the hybrid image such that the visible light camera captures a subsequent image having a quality factor that meets or is greater than the predetermined threshold.

20 Claims, 13 Drawing Sheets

SYSTEM AND METHOD OF ADJUSTING A CAMERA BASED ON IMAGE DATA

FIELD OF TECHNOLOGY

The subject matter herein generally relates to mobile devices, and more specifically relates to a system and method of adjusting camera image data captured by mobile device cameras.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, and handheld computers.

Mobile devices allow users to have an integrated device which can perform a variety of different tasks. For example, a mobile device can be enabled for each of or some of the following functions: voice transmission (cell phones), text transmission (pagers and PDAs), sending and receiving data for viewing of Internet websites and multi-media messages. Additionally, mobile devices can include one or more applications such as a camera application for capturing photographs or videos.

BRIEF DESCRIPTION OF THE DRAWINGS

Implementations of the present technology will now be described, by way of example only, with reference to the attached figures, wherein.

DETAILED DESCRIPTION

Figure 1:
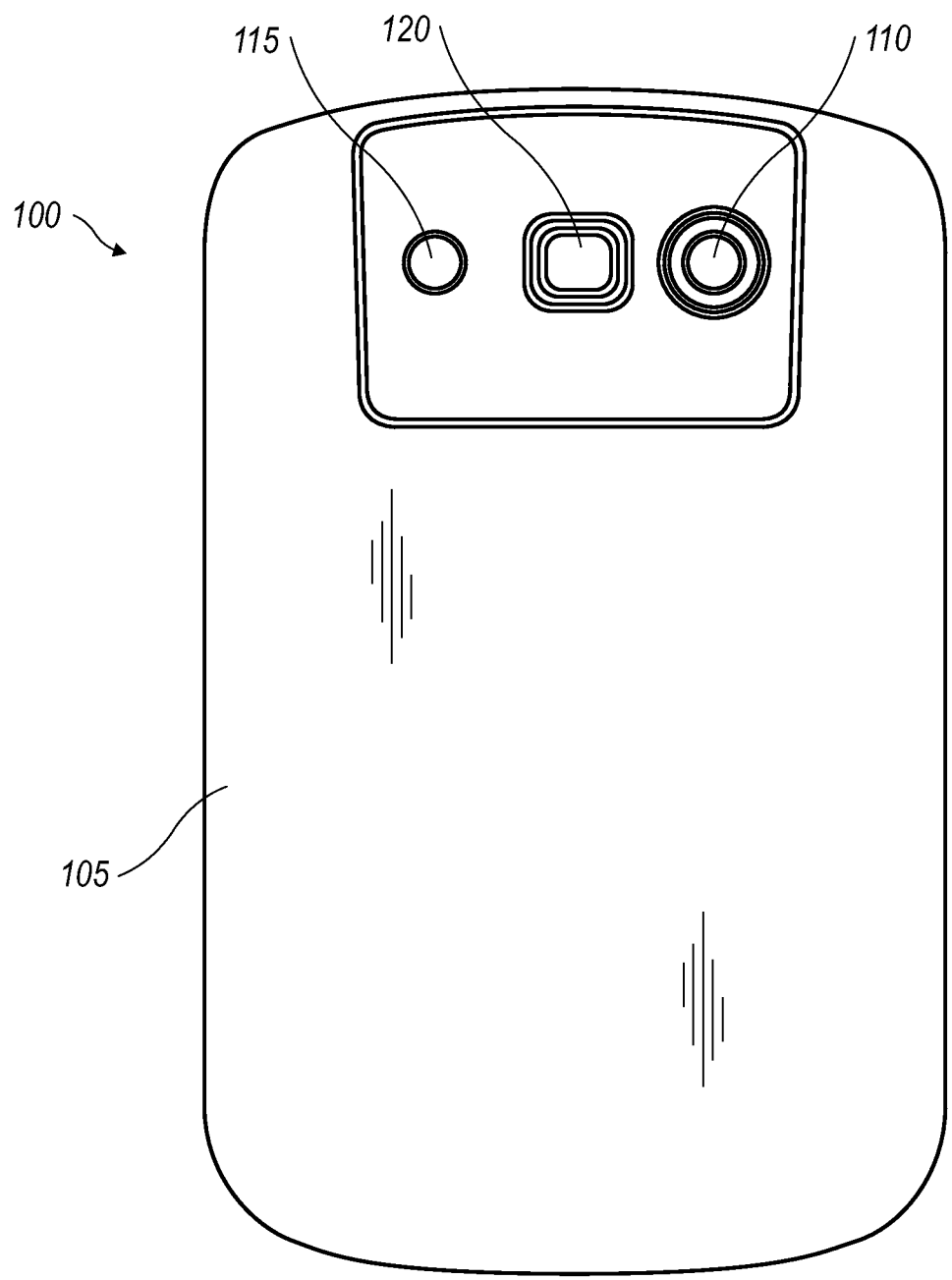
FIG. 1 is an illustration of a rear view of an example mobile device having a visible light camera module and a non-visible light camera module in accordance with an example implementation of the present technology.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the disclosure is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly through intervening components, is not necessarily limited to a physical connection, and allows for the transfer of data. The term "mobile device" is defined as any electronic device that is capable of at least accepting information entries from a user and any electronic device that includes its own power source. "Wireless communication" means communication that occurs via an electromagnetic field between communicatively coupled devices. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. A "histogram" is defined as a collection of a plurality of consecutive images (or image data) from a camera module. The histogram enables the construction of a history of a particular image using the previous images from the plurality of consecutive images in the histogram. "Dynamic range" as used herein describes the ability to capture objects in varying light conditions. A greater dynamic range allows for better capturing of images in light conditions that are dimmer and brighter than in a lesser dynamic range. "Dynamic range swing" as used herein refers to light conditions going from one extreme of the dynamic range to the other.

As mobile devices are compact, real estate within the mobile device is limited and compromises need to be made as to which components to include depending on the desired needs functions of the mobile device. With regard to mobile devices having cameras, the cameras typically have an infra-red cut-off filter to allow the camera to capture color images. However, the filter blocks a significant percentage of light energy available in the scene which is being captured by the camera, thereby increasing the minimum light level required to generate an image. As a result, images captured on mobile device cameras tend to be darker. Additionally, as flashes on mobile device cameras require additional energy to power the flashes, lower-powered flashes are implemented, leading to a darker resultant image. As mobile devices having cameras require a higher minimum light level to generate an acceptable image, mobile device cameras are typically insufficient to capture nighttime images, indoor images, other low-light images, excessive light images, such as outdoor overly-sunlit images, or any other low-quality image. For example, in an environment in which there is full sun exposure or in an environment such as a darkroom both autofocus and fixed-focus lens cameras will produce substandard video output or substandard images. As the camera attempts to adjust or account for the lighting or lack thereof, the image processor will cycle through several settings in an attempt to find an optimum configuration for capturing images in such environments, thereby consuming excessive processing time, processing power, and battery life. Accordingly, the present disclosure provides a system and method of adjusting camera image data captured by a mobile device in an efficient manner.

The present disclosure provides for a system and method of adjusting camera image data. For example, the method of adjusting camera image data provides for detecting errors or poor image quality characteristics in an image captured by a visible light camera of a mobile device. The method of adjusting camera image data also provides for correcting for or eliminating such errors or poor image quality characteristics with a non-visible light camera image captured by a non-visible light camera of the mobile device by augmenting the low-quality image. While the present technology can operate or process image data, the present disclosure provides illustrations of the images associated with the image data to provide an illustration of the technology. In some embodiments, the intermediary images can be displayed, but in other embodiments no images are displayed until the image is fully processed, for example after being augmented.

In at least one implementation, the method of adjusting camera image data can include determining a quality factor of image data generated by a visible light camera module based on at least one predetermined characteristic; comparing the quality factor to a first predetermined threshold; augmenting the image data from the non-visible light camera module with image data generated by a non-visible light camera module to generate hybrid image data when the quality factor is below the first threshold.

For example, when an image is captured by a visible light camera of a mobile device, the quality of the image is analyzed. For example, a quality factor can be one or more of the following: the sharpness of the image, the lens exposure, the total exposure time, the luminance, color variations, whether there are any dead pixels (such as overexposed, underexposed, or unexposed pixels), or other quality characteristics of the image. In the example of a color variation, the determination can be made based on non-uniform colors, especially for regions that are outlines of shapes, and uniform flat regions and transition regions between two distinct color patterns. For example, when the quality factor is a color variation, a determination can be made that the quality of the image is acceptable if the image data from the visible light camera is above a threshold which in one example can be 95%. The example threshold of 95% can indicate the ability to track changing conditions via the visible light camera. In another example, image data passing the image quality level can be based on the type of lighting, for example, an indoor incandescent lighting or an outdoor daylight light spectrum. In one example, the image signal processor (ISP) can determine color uniformity for individual regions, pixels, groups of pixels, or use a look up table to scan the same region, pixels or group of pixels over a number of sequential images. Another quality factor can be "image signal to noise ratio."

The quality factor of the image can be compared to a predetermined threshold (for example, a minimum sharpness level or value that is considered as an acceptable quality). In another example when a look up table is utilized, the determination of whether the quality factor is below a predetermined threshold can involve comparing the color component of the same pixel over a series of images to ensure that the color component is not changing. In another example, when the quality factor is an image signal to noise ratio, a determination is made as to whether the image is above a noise threshold (e.g., a noise floor). If the quality factor is at or below the predetermined threshold, a command can be sent to the non-visible light camera module of the mobile device to turn-on, activate, fully power or otherwise power the non-visible light camera module. For example, the non-visible light camera module can be activated when the visible light camera module is enabled but can be configured to enter into a low power mode when the non-visible light camera module is not needed. In other embodiments, the non-visible light camera module can be powered off until a determination is made that augmentation is required, and then the visible light camera module can enter a lower power mode, thereby further reducing power consumption. The low power mode can also be resumed between individual image data acquisition periods.

The non-visible light camera module can then be programmed and synchronized with the visible light camera such that when the visible light camera captures image data, the non-visible light camera will substantially simultaneously capture corresponding non-visible light image data. Alternatively, if the visible light camera and non-visible light camera acquire image data at different times, then an interpolation can be implemented to obtain an approximation of the image data at a given time. Alternatively, the image data from the visible light can be interpolated to be synchronized with the non-visible light camera data and then augmented. The visible light image data and the non-visible light image data can be combined with the non-visible light image data to form hybrid image data. The non-visible light image data can be combined with the visible light image data such that the quality of the hybrid image data has a quality factor that is at least equal to or greater than the predetermined threshold. Based on the quality of the hybrid image, the image sensor associated with the visible light camera can be adjusted, thereby ensuring that subsequent images captured by the visible light camera are of sufficient quality as compared to the predetermined threshold. In at least one implementation, after the hybrid image is formed or after the image sensor is adjusted, the non-visible light camera can be powered down, placed in an inactive state, placed in a standby state, or placed in any other low-powered state until a command or request is received in response to a determination that the visible light image data has a quality factor that is below the predetermined threshold, thereby conserving battery power, processing power, and image processing time. Moreover, as the quality factor of each image is analyzed and augmented or corrected as necessary, image data is dynamically augmented or corrected to provide images of acceptable quality.

Further details and examples of the present system and method of adjusting camera image data will now be discussed in relation to FIGS. 1-13.

FIG. 1 illustrates a view of a rear side 105 of an example mobile device 100 adapted to capture images in accordance with an example implementation. The illustrated mobile device 100 is a cellular phone but can also be a smartphone, a netbook, an electronic tablet, an electronic pad, a personal digital assistant (PDA), or any other similar electronic device which includes at least one camera module configured to capture images, such as still photo images, video images, or both still and video images. In FIG. 1, the mobile device 100 can include a visible light camera module 110 and a non-visible light camera module 115. Also illustrated in FIG. 1, the mobile device 100 can include a flash 120. Images sensed by the visible light camera module 110, the non-visible light camera module 115, or both the visible light camera module 110 and the non-visible light camera module 115 can be captured as photographs or videos. In one example, a camera application executed by a processor (not shown) is communicatively coupled to one or both of the visible light camera module 110 and the non-visible light camera module 115. The flash 120 can provide light to assist in exposing the object or objects to be captured as a photograph or video by the visible light camera module 110 and the non-visible light camera module 115. In other implementations, the flash 120, the visible light camera module 110, and the non-visible light camera module 115 can be located in different positions relative to one another as well as different positions on the backside of the mobile device 100. In at least one implementation, the flash 120, the visible light camera module 110 and the non-visible light camera module 115 can be located on the front side of the mobile device 100. In another embodiment, the visible light camera module 110 and non-visible light camera module 115 can be implemented as a single module having one or more components. For example, one or more prisms, minors, or any combination thereof can be used to allow light received through a lens to be transferred to a visible light sensor and a non-visible light sensor. In other embodiments, filters can be implemented so that a single sensor type can be implemented.

Figure 2:
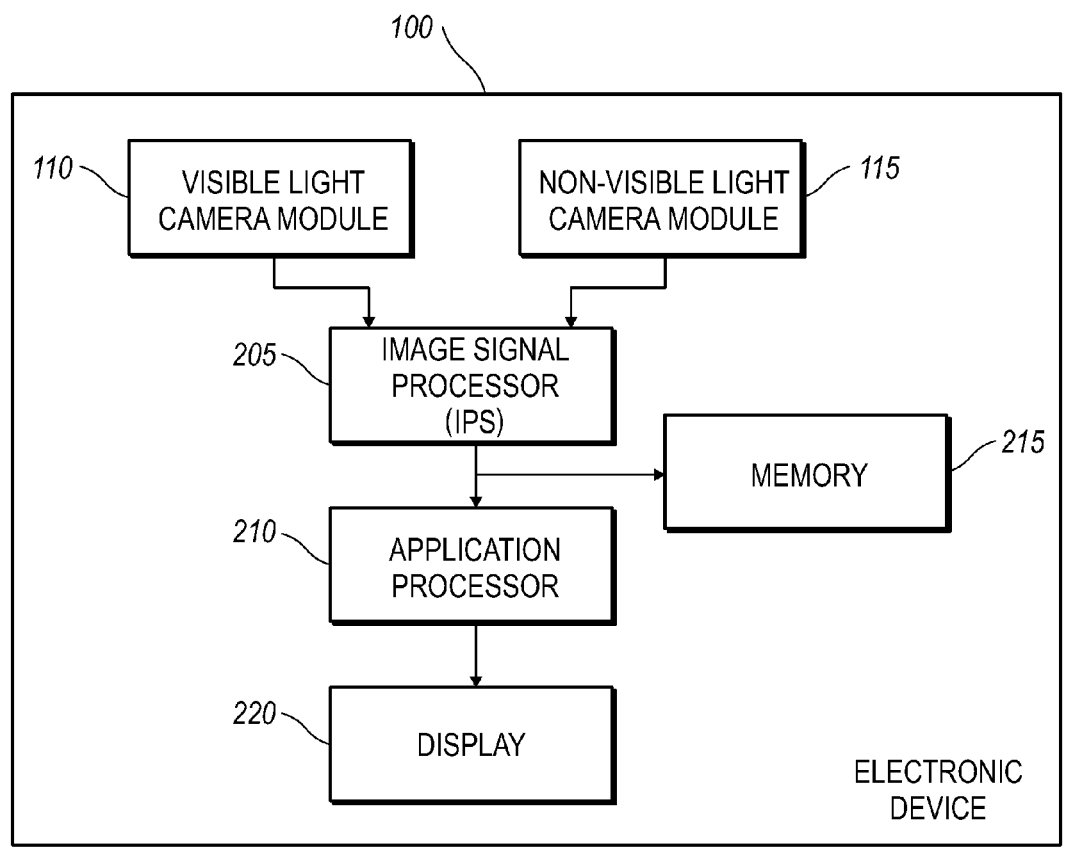
FIG. 2 is a block diagram of an example mobile device configured for adjusting camera image data in accordance with an example implementation of the present technology.

FIG. 2 is a block diagram of an example mobile device 100 in accordance with an example implementation of the present disclosure. In FIG. 2, the mobile device 100 can include the visible light camera module 110 and a non-visible light module camera 115. Each of the visible light camera module 110 and the non-visible light camera module 115 can be communicatively coupled to a processor, such as an image signal processor (ISP) 205. In FIG. 2, the visible light camera module 110 can include a camera lens (not shown). The visible camera module 110 can include an image sensor (not shown) that is adapted to convert the optical image captured by the visible camera module 110 into an electrical signal processed by the ISP 205. The image sensor of the visible camera module 110 can be a charge-coupled device (CCD), complementary metal-oxide-semiconductor (CMOS), a hybrid CCD-CMOS image sensor, or any other sensor adapted to convert an optical image to an electrical signal. The visible light camera module 110 can allow visible light to pass through to the ISP 205. For example, the visible light camera module 110 can filter the light so that it allows light having wavelengths from 400 nm-700 nm to reach the image sensor and to pass through to the ISP 205.

Similarly, the non-visible light camera module 115 can include a non-visible light camera lens (not shown) for capturing non-visible light images of a scene. The non-visible light camera module 115 can be communicatively coupled to the image signal processor 205 to convert the image captured by the non-visible light camera module 115 into an electrical signal. The non-visible light camera module 115 can be an infrared camera module, a thermal camera module, a night vision camera module, an ultraviolet camera module, or any other camera module configured to capture images other than visible light images. For example, in an implementation where the non-visible light camera module is an infrared camera module, the infrared camera module can allow infrared (IR) light to pass through to the respective image sensor but can block all or most of the visible light spectrum of a scene or image. For example, the infrared camera module can allow light wavelengths from 700 nm-900 nm of the ambient light to reach the image sensor of the non-visible camera module through to the ISP 205.

In FIG. 2, the ISP 205 can be a processor module dedicated to receiving image data from one or both of the visible light camera module 110 and the non-visible light camera module 115. A processor as used herein can refer to a hardware processor such as an integrated circuit processor. The ISP 205 can be directly or indirectly coupled to the mobile device 100. The ISP 205 can be a processor module including one or more processors. In other implementations, the ISP 205 can include one or more image signal processors. In at least one embodiment, the ISP 205 can be a single chip processor configured to analyze image data to determine a quality of the image data based on at least one predetermined characteristic (for example, sharpness, lens exposure time, total exposure time, luminance, whether a pixel of the image data is dead, or other characteristics of images). The ISP 205 can be further configured to transmit a request to the non-visible light camera module 115 to power on or otherwise change the powered state of the non-visible light camera module 115 and capture non-visible light image data. The ISP 205 can then combine visible light image data and corresponding non-visible light image data to form a hybrid image data that has an acceptable quality. In FIG. 2, the ISP 205 can be communicatively coupled to an application processor 210. The ISP 205 can transmit the hybrid image data, the analyzed visible light image data, the analyzed non-visible light image data, or any combination thereof, for further processing.

In FIG. 2, the application processor 210 can be a separate processor from the ISP 205, a main processor of the mobile device 100, or any processor which can be configured to receive image data from the ISP 205. The application processor 210 can be directly or indirectly coupled to the mobile device 100. The application processor 210 can be a processor assembly including one or more processors. The application processor 210 can be a solid state processor, a core processor, or any other processor configured to execute instructions for displaying image data on the mobile device 100. The application processor 210 can receive image data from the ISP 205, for example, hybrid image data. The application processor 210 can then process the hybrid image data and execute instructions to display the hybrid image data on a display 220 of the device 100.

The display 220 can be a touchscreen display, a liquid crystal display (LCD), a light emitting diode display (LED), an active matrix organic light emitting diode display (AMOLED), or any other display configured to display graphical information.

Also illustrated in FIG. 2, the mobile device 100 can include a memory device 215. For example, the memory device 215 can be transitory memory, non-transitory memory, or any combination thereof. For example, non-transitory memory can be implemented as Random Access Memory (RAM), Read-Only Memory (ROM), flash, ferromagnetic, phase-change memory, and other non-transitory memory technologies capable of storing image data including hybrid image data. Transitory memory can store signals and radio wave data. The memory device 215 can at least store images captured by the visible light camera module 110, images captured by the non-visible light camera module 115, and hybrid image data formed by the ISP 205. In at least one implementation, the memory device 215 can store the instructions for performing the method of adjusting camera image data, as will be described in further detail below in relation to FIGS. 3-8B.

Figure 3:
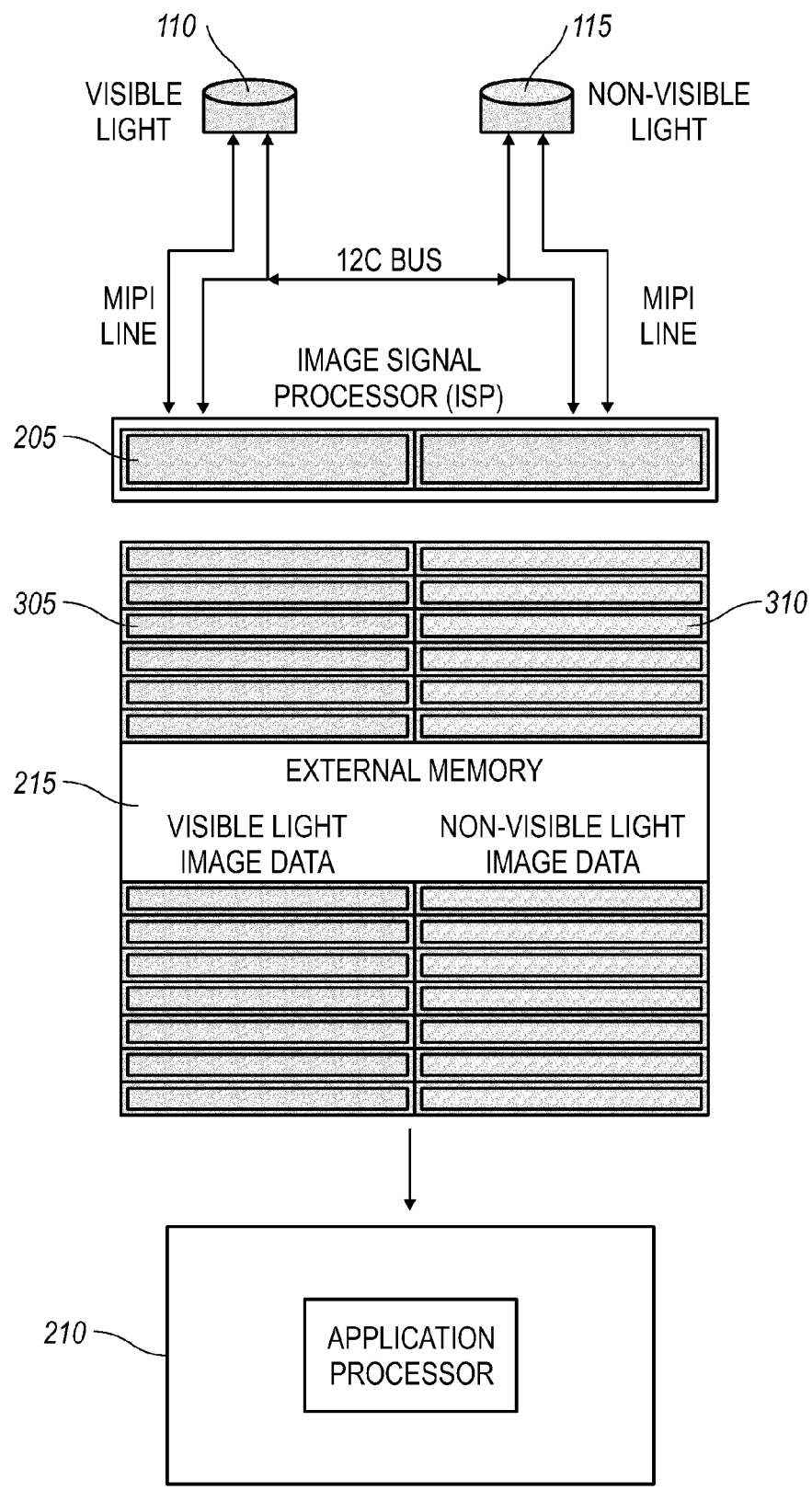
FIG. 3 is a block diagram of a portion of a system for adjusting camera image data in accordance with an example implementation of the present technology, including a memory device.

FIG. 3 illustrates a block diagram of the visible light camera module 110, the non-visible light camera module 115, the ISP 205, and memory device 215, and the application processor 210. In FIG. 3, the visible light module 110 and the non-visible light camera module 115 can be communicatively coupled to the ISP 205. The ISP 205 can be communicatively coupled to the memory device 215. As illustrated in FIG. 3, the memory device 215 can be external to the ISP 205 and the memory device 215 can be within the mobile device 100 (shown in FIG. 2). In another implementation, the memory device 215 can be integrated with the ISP 205 such that memory device 215 is internal to the ISP. The memory device 215 can be partitioned into at least a first portion 305 and a second portion 310. The first portion 305 of the memory device 215 can be reserved for storing image data captured by the visible light camera module 110. The second portion 310 of the memory device 215 can be reserved for storing image data captured by the non-visible light module 115.

While the illustrated embodiment shows the memory device 215 being partitioned into two portions, other organizations and structures of the data are considered within the scope of this disclosure. Another memory arrangement can include a "time based packet alignment" structure. The time based packet alignment arrangement can accept all data packets into the memory (as they become available), without re-shuffling, re-arranging or manipulating the data packets. The data packets are stored sequentially in consecutive memory locations such that the address locations can be continuously incremented. In the time based packet alignment arrangement, the storage of the data packets can ignore the packet type when storing the data packet. For example, the non-visible light data packet can be stored between two visible light data packets. The time based packet alignment arrangement can produce little overhead while accepting incoming information. In at least one implementation of the time based packet alignment, a unique "Packet ID" can be assigned to each packet. In another example, assigning a unique "Packet ID" to each packet can be the only additional action when storing a data packet or data packets to the memory. The Packet ID can be represented by an eight-bit (8-bit) number, such as 10011011. In another example, the Packet ID can be represented by a sixteen-bit (16-bit) number. Other data units can be used to represent the Packet ID as well. Once the Packet ID is assigned, a flag comprising the relevant information associated with the frame or image can be included. The flag can include relevant information, for example one or more of the following: a packet type, an identification number, a time stamp, whether the data (e.g., the frame or image) has been used for image enhancement or not (e.g., for image correction or augmentation), and other system level details. Additionally, as the amount of available memory decreases in response to storing new data packets therein, older data packets can be erased, making room for the newer ones. Such memory management can be controlled by the application processor 210.

In FIG. 3, the application processor 210 can be communicatively coupled to the memory device 215 to receive: image data associated with the visible light camera module 110 and stored in the first portion 305 of the memory device 205, image data associated with the non-visible light camera module 115 and stored in the second portion 310 of the memory device 205, or hybrid image data formed from the image data associated with the visible light camera module 110 and the image data associated with the non-visible light camera module 115.

Figure 4:
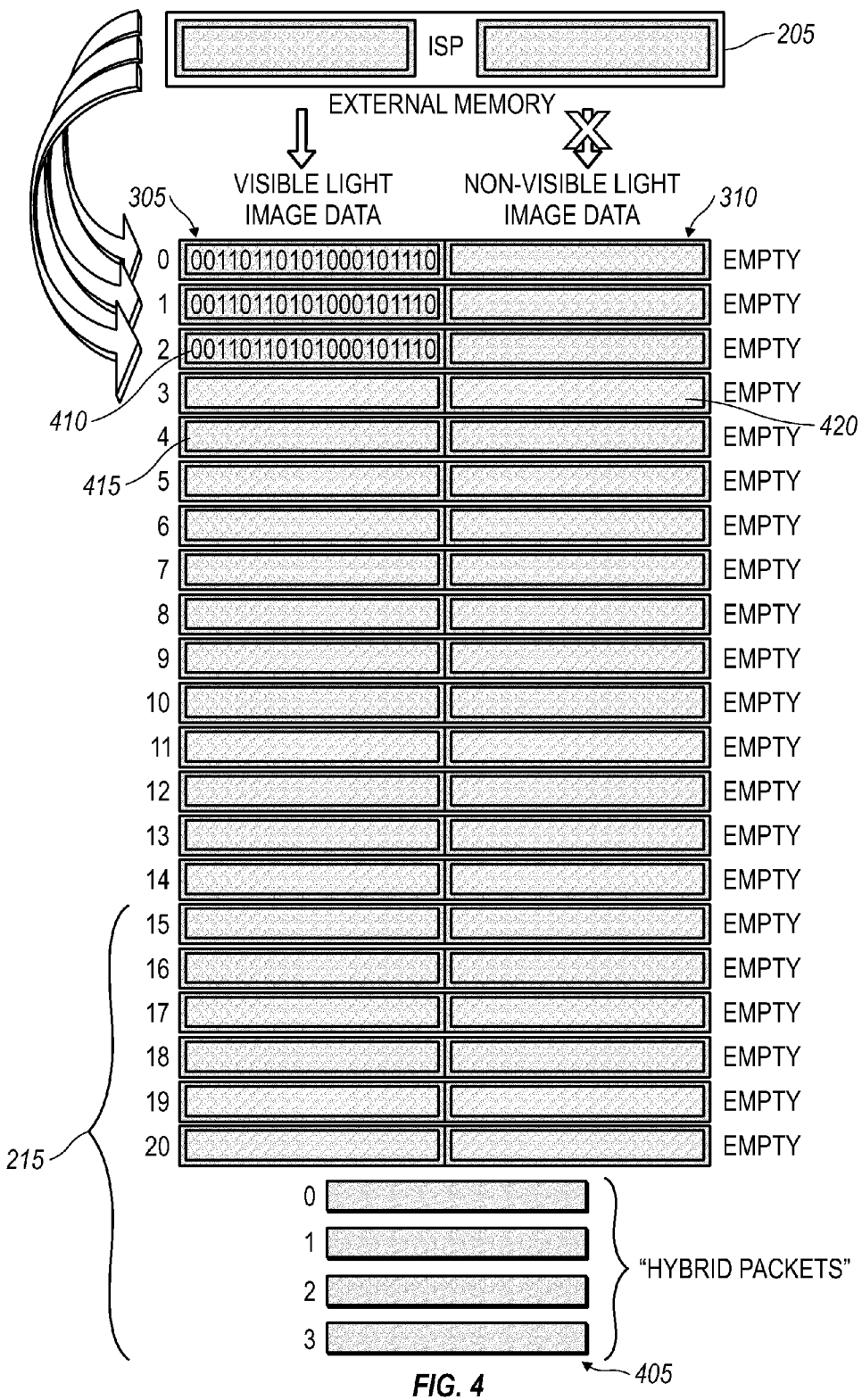
FIG. 4 is an illustration of a memory device having portions for non-visible light camera image data, visible light camera image data, and hybrid image data in accordance with an example implementation of the present technology.
Figure 5:
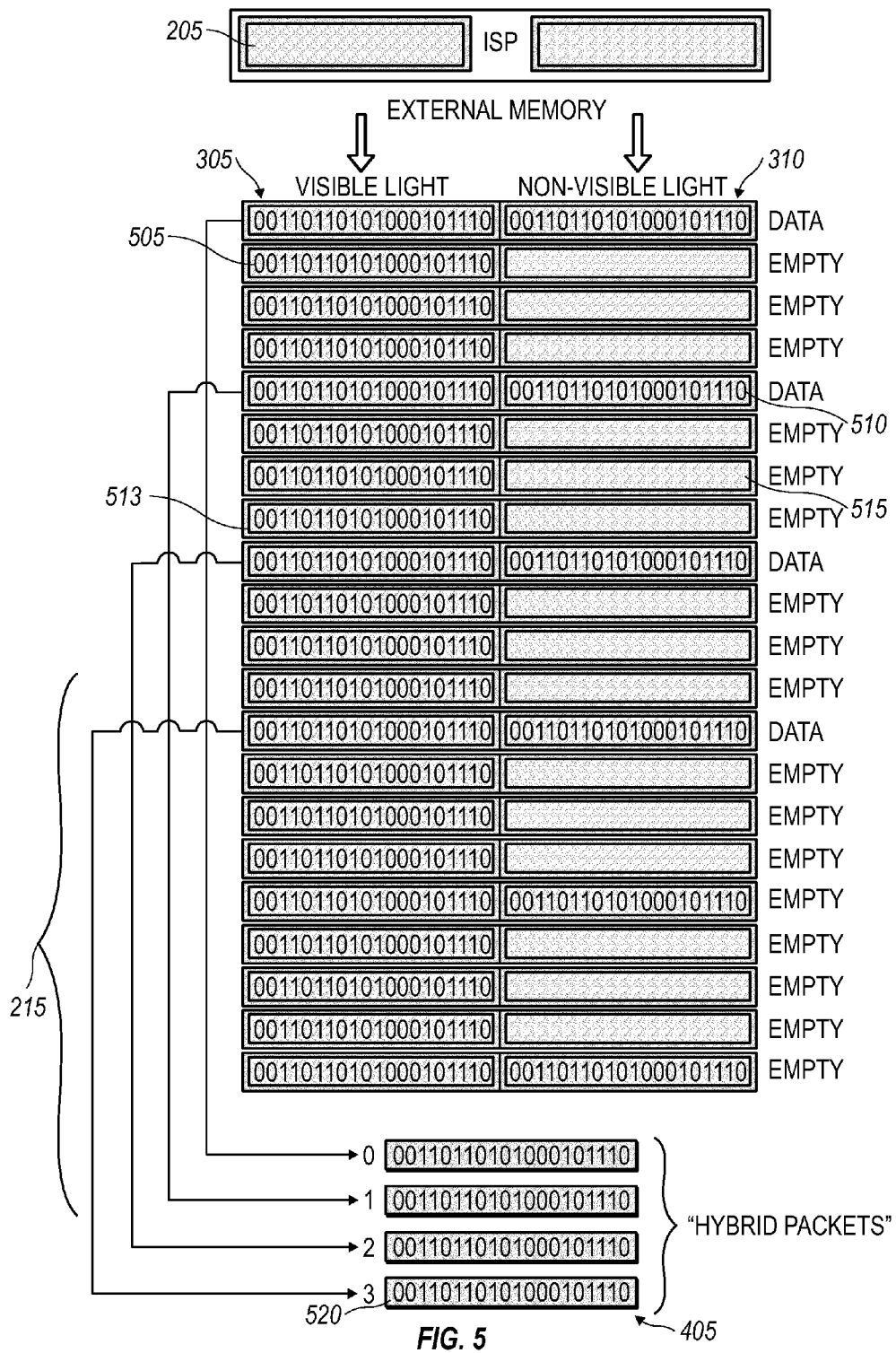
FIG. 5 is an illustration of a memory device having portions for non-visible light camera image data, visible light camera image data, and hybrid image data in accordance with an example implementation of the present technology, with image data stored in the memory device.

FIGS. 4 and 5 illustrate image data stored in the memory device 215. In FIG. 4, the image data is received by the memory device 215 from the ISP 205. Additionally, FIG. 4 illustrates image data 410 captured from the visible light camera module 110 (shown in FIG. 2), where no image data is received from the non-visible light camera module 115 (shown in FIG. 2). In FIG. 4, the memory device 215 is partitioned into three portions. In other embodiments, the memory device 215 is not partitioned as illustrated. Similar to FIG. 3, the first portion 305 can be dedicated to store the image data captured by the visible light camera module 110 (not shown). The second portion 310 can be dedicated to store the image data captured by the non-visible light camera module 115 (not shown). As illustrated in FIG. 4, the first portion 305 and the second portion 310 can be partitioned such that the partitions 415 of the first portion 305 correspond to the partitions 420 of the second portion 310. For example, as illustrated in FIG. 4, the partitions 415 of the first portion 305 can be parallel to the partitions 420 of the second portion 310. In other embodiments, the second portion 310 can be structured such that it only has partitions or members in accordance with a desired ratio of the first portion 305 as will be described below. For example, there can be one partition of the second portion 310 to every four partitions of the first portion 305. The third portion 405 can be dedicated to store hybrid image data formed from the visible light camera image data and the non-visible light camera image data. In FIG. 4, visible light camera image data 410 captured by the visible light camera module 110 can be stored in the first portion 305 of the memory device 215.

In FIG. 4, visible light camera image data 410 is stored in the first three partitions 415 of the first portion 305. For example, as image data captured by the visible light camera module 110 can be stored in the first portion 305 of the memory device 215, each visible light camera image datum 410 can be stored in a respective partition 415 of the first portion 305. In at least one implementation, the visible light camera image data 410 can be stored in the first portion 305 of the memory device 215 in the order that the visible light camera image data 410 are captured. Each visible light camera image datum 410 can be time-stamped indicating the time of capture and can be stored in the first portion 305, thereby providing a reference or marker by which a non-visible light camera image data, captured at a substantially same time as a visible light camera image data 410, can be retrieved and compared with the captured visible light camera image data 410. In other embodiments, each visible light camera image data 410 can be marked or otherwise signified with an indicator that can correlate the visible light camera image data 410 with a non-visible light camera image data received at substantially the same time as the visible light camera image data 410. Additionally, as indicated above, when the visible light camera module 110 and non-visible light camera module 115 cannot record the images at substantially the same time, an interpolation routine or an extrapolation routine can be implemented.

FIG. 5 illustrates the memory device 215 illustrated in FIG. 4, except that the memory device 215 has stored both visible light camera image data 505 and non-visible light camera image data 510 that have been received and processed by the ISP 205. As illustrated in FIG. 5, twenty visible light camera image data 505 are stored in the first portion 205 of the memory device 215. Six non-visible light camera image data 510 are in the second portion 310 of the memory device 215. In FIG. 5, the visible light camera image data 505 are allocated in the first portion 305 of the memory device 215 in the order in which the visible light camera image data 505 are received. For example, the first portion 305 is partitioned into a plurality of first partitions 513 (such as visible light partitions). Each visible light camera image data 505 can be stored in a respective first partition 513 of the first portion 305. Similarly, the non-visible light camera image data 510 are stored in the second portion 310 of the memory device 215 in the order in which the non-visible light camera image data 510 are received. The second portion 310 can also be partitioned into a plurality of second partitions 515 (such as non-visible light partitions). Each non-visible light camera image data 510 can be stored in a respective second partition 515 of the second portion 310.

As illustrated in FIG. 5, the first partitions 513 and the second partitions 515 can be parallel to one another, such that visible light camera image data 505 stored in a first partition 513 and non-visible light camera image data 510 stored in an adjacent second partition 515 indicate that the visible light camera image data 505 and the non-visible light camera image data 515 were captured at substantially the same time. For example, in FIG. 5, one non-visible light camera image data 510 is captured for every fourth visible light camera image data 505. Accordingly, a second partition 515 adjacent to every fourth first partition 513 (beginning from the first of the first partitions 513) has non-visible light camera image data 510 corresponding to a visible light camera image data 505. In other implementations, the ratio of visible light camera image data 505 to the non-visible light camera image data 510 can be other than capturing one non-visible light camera image data 510 for every fourth captured visible light camera image data 505. For example, the ratio can include capturing one non-visible light camera image data 510 for every other or every alternate visible light camera image data 505, for every fifth visible light camera image data 505, for every tenth visible light camera image data 505, for every seventh visible light camera image data 505, for every twentieth visible light camera image data 505, for every twenty-fifth visible light camera image data 505, for every fiftieth visible light camera image data 505, for every one-hundredth visible light camera image data 505, for every visible light camera image data, or any other ratio. Increasing the frequency of non-visible light camera image data 510 can increase the accuracy and quality of augmenting the corresponding visible light camera image data 510; however, the increased frequency of capturing non-visible light camera image date 510 can require more processing time, more processing power, and more battery power. Alternatively, decreasing the frequency of capturing non-visible light camera images data 510 can decrease the processing time, reduce processing power, and preserve battery power, but the accuracy of augmenting the visible light camera image data 505 may not be as high as if the non-visible light camera image data 510 were captured more frequently. Thus, the frequency of capturing non-visible light camera image data 510 is proportional to the amount of processing power and processing time required to form a higher quality hybrid image.

The ratio of the non-visible light image data 510 can be adjusted relative to the visible light image data 505 based on the quality of a hybrid image. For example, if the quality of the hybrid image is below a predetermined threshold, then the number of images acquired by the non-visible light camera module 115 can be increased. Furthermore, while the illustrated example of FIG. 5 shows some partitions of the non-visible light portion 310 as being empty, the non-visible light partition 515 can be full and a correspondence formula, matrix or other look up feature can be implemented such that values corresponding with the visible light image data 505 can be determined or derived, for example, timestamps.

Also illustrated in FIG. 5, the memory device 215 can include a third portion 405 for storing hybrid image data formed from a corresponding visible light camera image data 505 and a non-visible light camera image data 510. For example, in FIG. 5, there are four hybrid image data 520 stored in the third portion 405 of the memory device 215. Details as to the formation of the hybrid image data 520 will now be described with respect to FIGS. 6A-9. While FIGS. 6A-9 illustrate various images, the images illustrated therein are generally not displayed on the display 220 of the mobile device 100. Rather the illustrations of FIGS. 6A-9 are provided to illustrate the implementation of the method as presented herein.

Figure 6A:
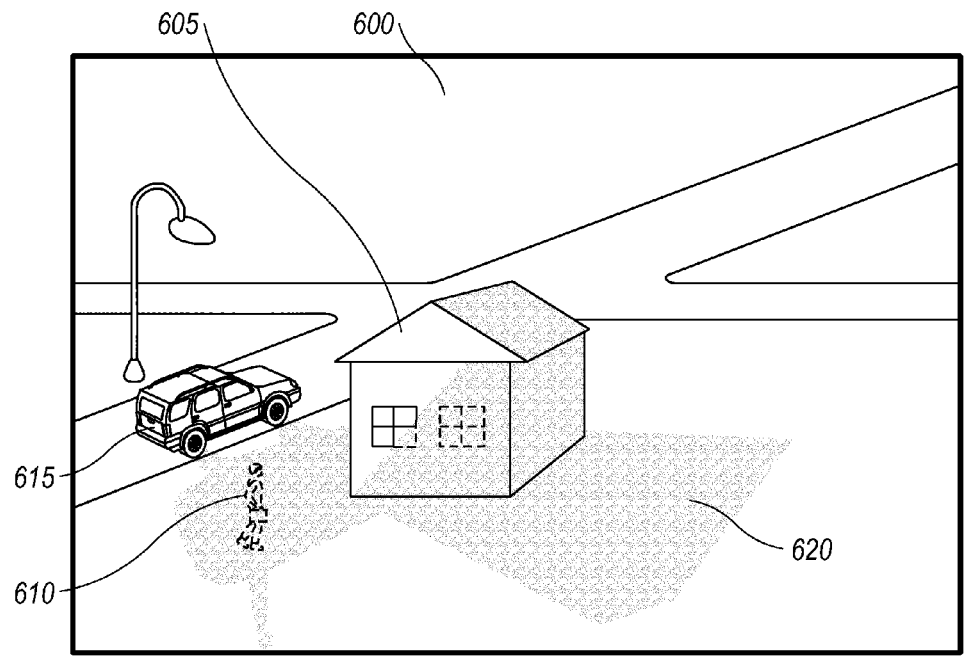
FIG. 6A is an illustration of a visible light camera image in accordance with an example implementation of the present technology.

In an example implementation of the system and method for adjusting image data captured by a mobile device, a visible light camera image 600 (shown in FIG. 6A) can be captured by a visible light camera module 110 of a mobile device 100. In FIG. 6A, the visible light camera image 600 captures a scene of a house 605, a car 615, a person 610 walking towards the house 605, and a shadow 620 of the house 605 and the car 615. However, as illustrated in FIG. 6A, the region of the image containing the person 610 in the image 600 is out of focus (as represented by hashed lines). That is, a quality of the image 600 is below a predetermined threshold. For example, the image 600 can be of an unacceptable quality based on a determination that an image sharpness, an exposure time (for example, based upon a determination of a level of misalignment for lens exposure time), a luminance, a presence of dead pixels (for example, underexposed, overexposed, or unexposed pixels), missing portions of an image, a blurriness, or any other predetermined characteristic of an image falls below a predetermined threshold. In other embodiments, more than one characteristic can be analyzed, and a determination made if the more than one characteristic is below the respective thresholds. When more than one characteristic is analyzed, the determination of whether an image needs augmentation can be based on the determination that one of the more than one characteristic is below the respective predetermined threshold. Thus, if a single characteristic is below the respective predetermined threshold, the image can be augmented. In other embodiments, a determination can be made that a number of characteristics are below respective predetermined threshold, but the determination that the image will not be augmented can be made if a single characteristic if a selected number of characteristics are above the respective threshold, for example if the characteristics of overexposure and underexposure are above the respective thresholds then no augmentation can be performed.

The predetermined threshold can represent the minimum values of predetermined characteristics of an image that correspond to the minimum quality of an acceptable image. In response to or substantially simultaneously with the capture of the visible light camera image 600, a request can be transmitted to a non-visible light camera module 110 to capture a non-visible light camera image. From the non-visible light camera image, the ISP 205 can fix, correct, or augment the unacceptable visible light image 600 with at least a portion of the non-visible light image, such that a hybrid image having a sufficient quality can be formed.

Figure 6B:
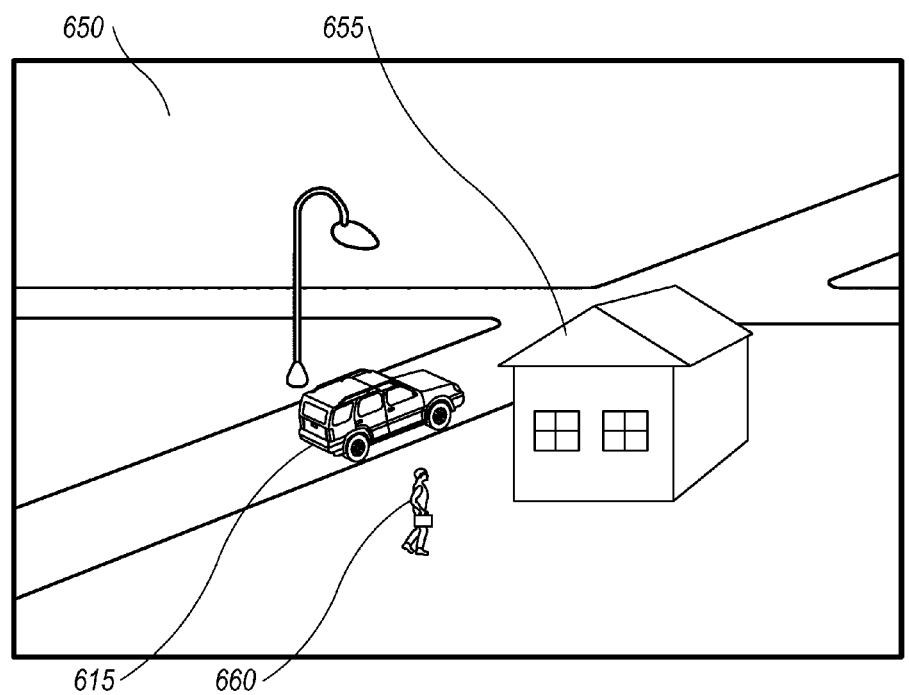
FIG. 6B is an illustration of a non-visible light camera image in accordance with an example implementation of the present technology.

In FIG. 6B, a non-visible light camera image 650 is illustrated which has been captured in response to the determination that the visible light image 600 has a quality factor that is unacceptable. That is, in response to a determination that a quality factor of the visible light image 600 falls below a threshold, a request to capture a non-visible light image can be transmitted to the non-visible light camera module 115. The non-visible light camera module 115, consequently, can be powered on or activated to an active state and can capture a non-visible light image 115. As illustrated in FIG. 6B, the house 655 and the person 660 of the non-visible light image 650 are clearer than the corresponding house 605 and person 610 of the visible light image 600. Additionally, as illustrated in FIG. 6B, the non-visible light image 650 does not include the shadows 620 as found in FIG. 6A.

Furthermore, comparing FIG. 6B to FIG. 6A, the non-visible light image 650 can be shifted or captured from a different vantage point or perspective than the visible light camera image 600. The shifted image of the non-visible light image 650 can be due to the non-visible light camera module 115 being mounted some distance away from the visible light camera module 110. In other instances, there is little to no shift in the images from the visible light image 600 as compared to the non-visible light image 650. In FIG. 6B, the shifting of the non-visible light image 650 as compared with the visible light camera image 600 has been exaggerated for illustrative purposes.

As illustrated in FIG. 6B, the house 655 in the non-visible light image 650, the car 615, and the person 660 appear shifted as compared to same objects in the visible light image 600. The shift can be due to the different perspectives of the non-visible light camera module 115 and the visible light camera module 110 resulting from the orientation of the non-visible light camera module 115 with respect to the visible light camera module 110. For example, the non-visible light camera 115 and the visible light camera 110 can be disposed side-by-side, at an angle to one another, or one on top of the other. In at least one implementation, the configuration of the hardware components of visible light camera module 110 and non-visible light camera module 115 can result in the respective images appearing shifted compared to one another. For example the visible light camera module 110 and the non-visible light camera module 115 can be configured to have different resolutions that result in the respective images appearing shifted compared to one another. In another implementation, the non-visible light camera 115 and the visible light camera 110 can be oriented one on top of the other, and a mirror or prism can be positioned therebetween such that the images captured from the visible light camera 110 and the non-visible light camera 115 have substantially similar perspectives. In such an implementation, the non-visible light image may not appear to be shifted when compared to the visible light camera image. To account for the variance in perspective, resolution, and zooming level between the non-visible light camera 115 and the visible light camera 110, calculations and image analysis can be performed to determine which portions of the visible light image 600 correspond with which portions of the non-visible light image 650.

Figure 7A:
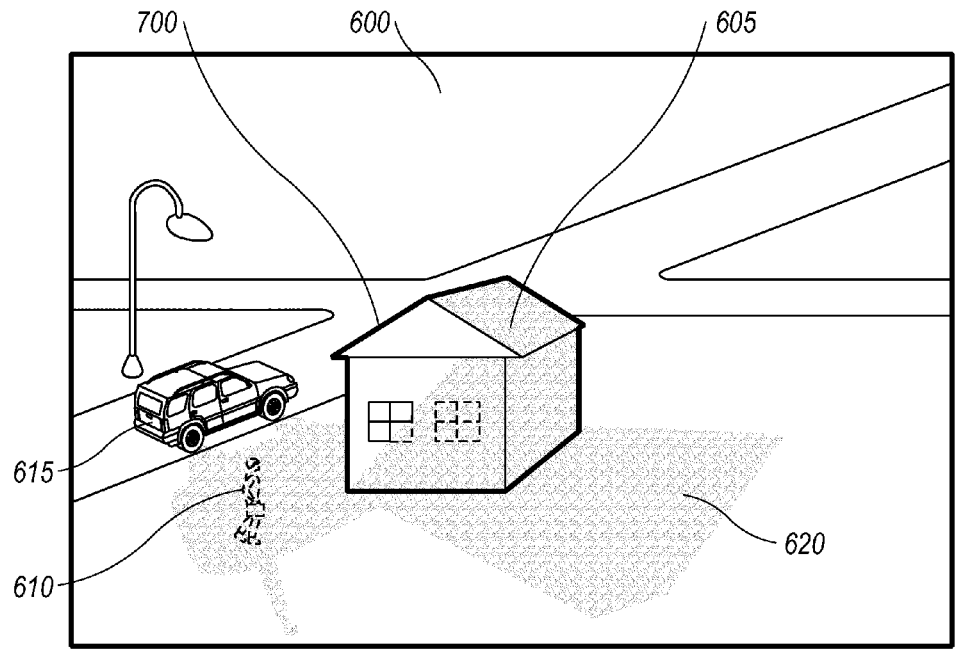
FIG. 7A is an illustration of a visible light camera image in accordance with an example implementation of the present technology, illustrating the contour of an object in the image.
Figure 7B:
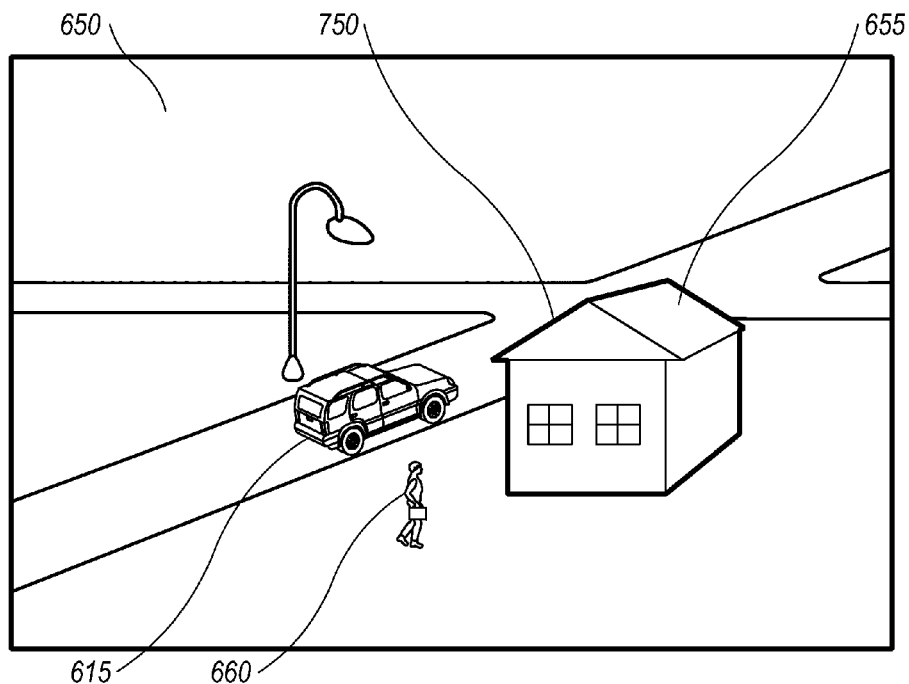
FIG. 7B is an illustration of a non-visible light camera image in accordance with an example implementation of the present technology, illustrating the contour of an object in the image.

For example, FIGS. 7A and 7B illustrate the implementation of the ISP 205 in determining which portion of the visible light image 600 is to be augmented, corrected, or fixed and determining which portion of the non-visible light image 650 corresponds to that of the visible light image 600. Specifically, in FIGS. 7A and 7B, the contours 700 of the house 605 in the visible light image 600 and the contours 750 of the house 655 in the non-visible light image 650 are identified. As illustrated in FIGS. 7A and 7B, the contours 700, 750 of the houses 605, 655 are represented by bolded outlines.

The contours 700, 750 of the house 605, 655 are illustrative of selecting a major contour for the images. In other embodiments, the contour could have been selected to be the road or other structure or significant shape. In at least one embodiment, a plurality of contours can be determined.

Figure 8A:
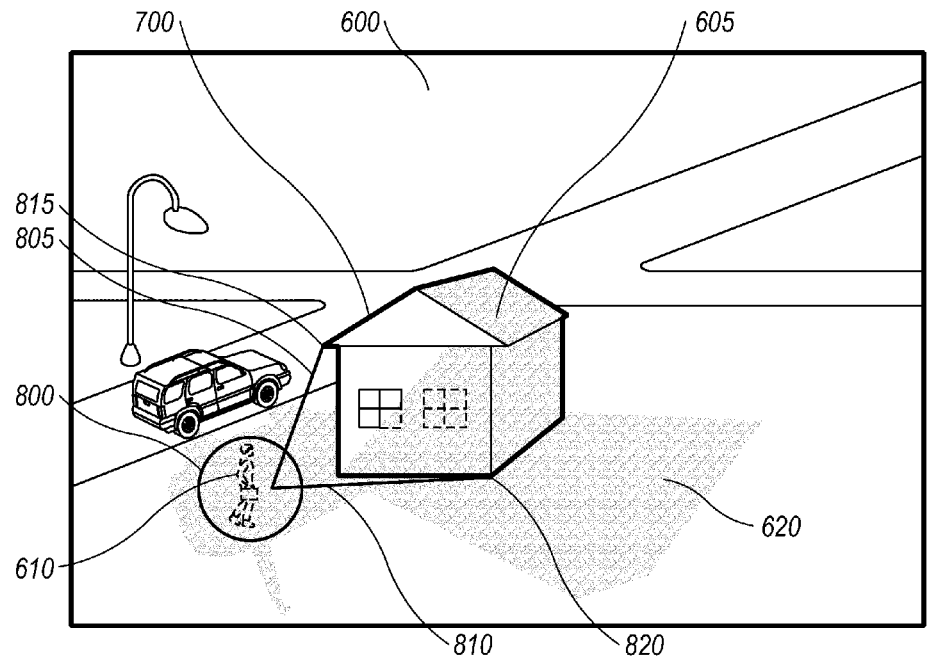
FIG. 8A is an illustration of a visible light camera image in accordance with an example implementation of the present technology, illustrating the determination of the location of the portion of the image that does not meet a predetermined threshold associated with an acceptable quality factor of an image relative to a contour of the image.
Figure 8B:
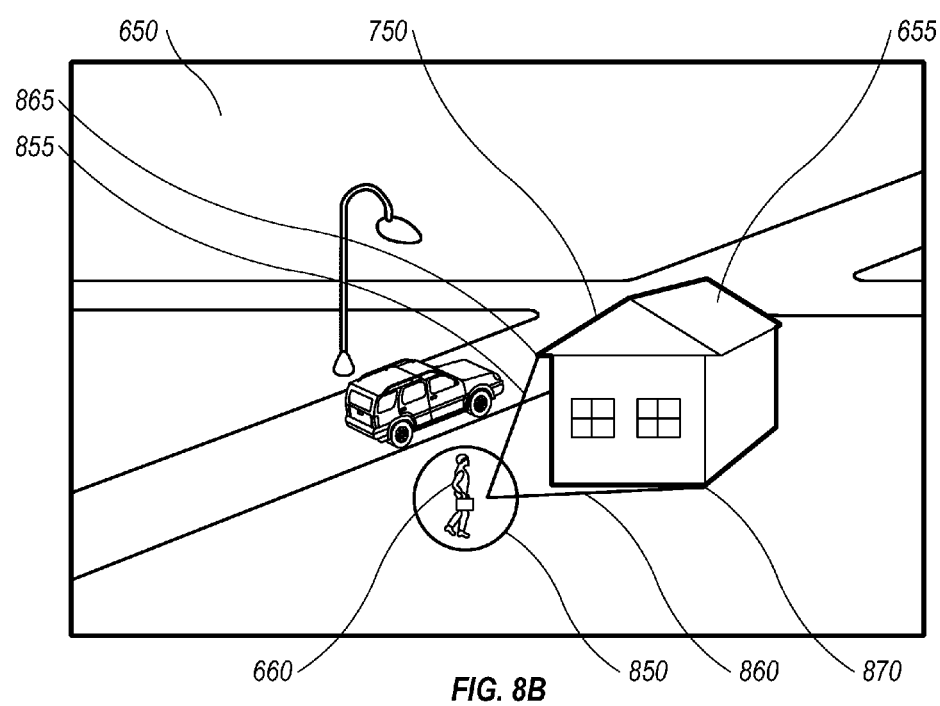
FIG. 8B is an illustration of a non-visible light camera image in accordance with an example implementation of the present technology, illustrating the determination of a portion of the non-visible light image corresponding to the portion of the visible light image illustrated in FIG. 8A that does not meet a predetermined threshold associated with an acceptable quality factor of an image.

With the contours 700, 750 identified, the contours 700, 750 can be used as references for determining which portions of the visible light image 600 correspond to which portions of the non-visible light image 650, as illustrated in FIGS. 8A and 8B.

FIGS. 8A and 8B illustrate the process of the ISP 205 identifying the portion of the visible light image 600 that includes a region 800 or portion having a quality factor that is less than a predetermined threshold. FIG. 8A illustrates the visible light image 600 in which the contour 700 of the house 605 has been identified (shown as a bolded outline of the house 605). Two points 815, 820 on the contour 700 are used to triangulate pixel data within the region 800 of the visible image 605 that has a quality factor that is less than a predetermined threshold. For example, a first vector 805 can be drawn from the first point 815 of the contour 700 to the region 800. A second vector 810 can be drawn from a second point 820 of the contour 700 to the region 800. The magnitude and direction of the first vector 805 and the second vector 810 can then be used to determine a corresponding region or corresponding portion of the non-visible light image 650 (shown in FIG. 8B).

Using the contour 700 of the visible light image 600 and the contour 750 of the non-visible light image 650, a scaling factor can be determined. The scaling factor can be determined in at least two dimensions. When the image is a three dimensional image, an additional scaling factor can be determined.

As illustrated in FIG. 8B, a third vector 855 can be drawn from a third point 865 on the contour 750 of the house 655 of the non-visible light image 650 to a region 850 of the non-visible light image 650 that corresponds to the region 800 of the visible light image 600. Similarly, a fourth vector 860 can be drawn from a fourth point 870 of the contour 750 of the house 655 of the non-visible light image 650 to the region 850 of the non-visible light image 650. The third vector 855 and fourth vector 860 are calculated using the appropriate scaling factors along with the first vector 805 and second vector 810, respectively. Thus, the region of the non-visible light image 600 corresponding to the region of the visible light image 650 having a quality factor below a predetermined threshold can be determined.

Figure 9:
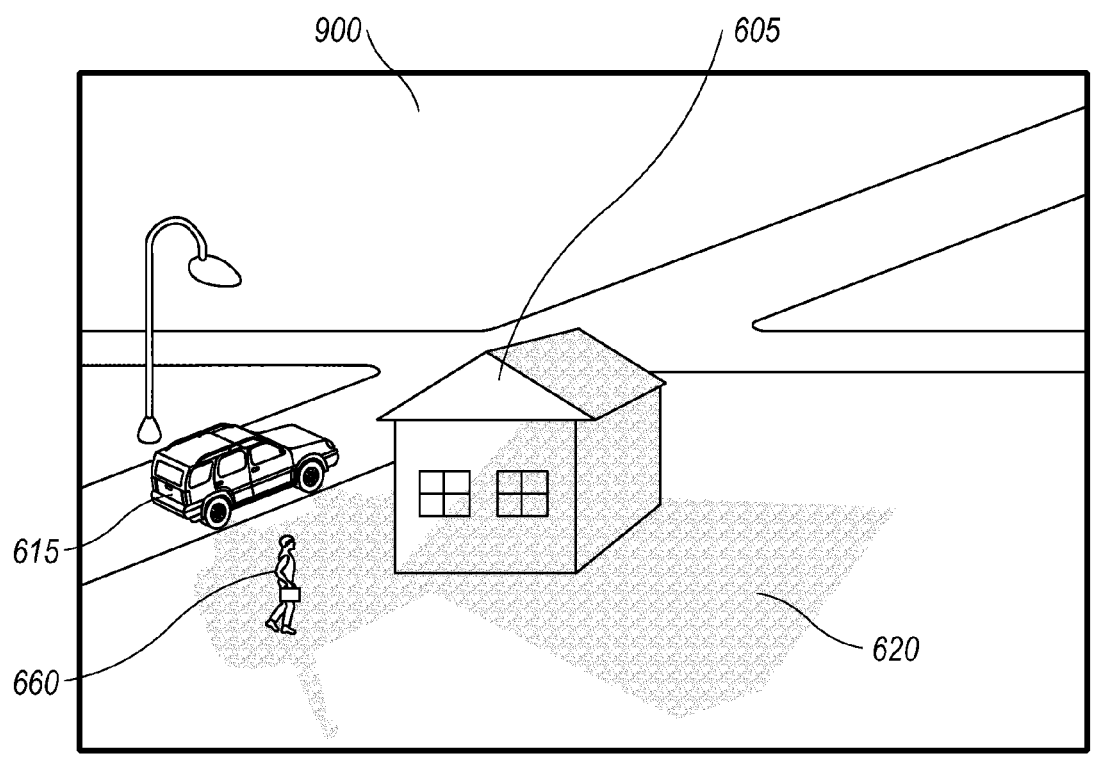
FIG. 9 illustrates a hybrid image of the visible light image of FIG. 6A and the non-visible light image of FIG. 6B.

With the corresponding regions 800, 850 of the visible light image 600 and the non-visible light image 650 identified, the region 850 of the non-visible light image 650 can be combined with the visible light image 600 to form a hybrid image 900, as illustrated in FIG. 9. For example, the region 850 of the non-visible light image 650 can replace the region 800 of the visible light image 600. In other implementations, the hybrid image 900 can be formed on a pixel by pixel basis. For example, the pixels of the region 850 of the non-visible light image 650 can replace the pixels of the region 800 of the visible light image 600 to result in a hybrid image 900, such as illustrated in FIG. 9.

In another implementation, the pixels, of the region 800 of the visible light image 600, that are determined to have a quality factor below the predetermined image can be replaced by pixels of the corresponding region 850 of the non-visible light image 650. For example, the pixels of the visible light image 600 can be augmented with data from the pixels of the non-visible light image 650 to enhance one or more characteristics of the visible light image 600, such that the color of the visible light image 600 is maintained. In at least one embodiment, the visible light image 600 (for example, the visible light image frame or the raw data frame of the visible light image 600), and the pixels thereof can form the foundation of the augmented or hybrid image 900 that will be displayed to the user. Each individual component of the visible light image 600 can be replaced by the "hybrid replica" or "augmented section" derived from augmenting or combining similar sections of the non-visible light image 650 and the visible light image 600. When augmenting the visible light image 600, the enhancements of the visible light image 650 are based on the non-visible light camera data 650 modifying the visible light image 600 such that the scaling and pixel density of the visible light image 600 is conserved, but the portion 800 or portions having a quality factor below a predetermined threshold are augmented. In other embodiments, the augmentation of the visible light image data 600 can be across all pixels of the visible light camera data 600.

In one example, the technique used to augment at least a portion of the visible light image 600 or form a hybrid replica of at least a portion of the visible light image 600 can be "sub pixel rendering." Sub pixel rendering takes advantage of the fact that each individual pixel consists of individual RED, GREEN and BLUE components. When the color of the pixel is determined to be below the threshold, the color ratio of the original pixel is augmented based on the data from the non-visible light image 650 to produce a hybrid image 900 (shown in FIG. 9). In another implementation, the size, resolution, and zoom level of the non-visible light image 650 can be adjusted to correlate with the size, resolution, and zoom level of the visible light image 600. The entire non-visible light image 650 can then be combined with the entire visible light image 600, and the pixels of the visible light image 600 which have a quality factor that falls below a threshold value can be replaced with the pixels of the non-visible light image 650 to result in a hybrid image 900, as illustrated in FIG. 9.

FIG. 9 illustrates a hybrid image 900 formed from the visible light image 600 of FIGS. 6A, 7A, and 8A and the non-visible light image 650 of FIGS. 6B, 7B, and 8B. As illustrated in FIG. 9, the shadows 620 of the house 605 and car 615 are provided. Also provided is the person 660 of the non-visible light image 650. That is, the missing portion or low quality portion 800 (shown in FIG. 8A) of the visible light image 600 is replaced with the corresponding portion 850 (shown in FIG. 8B) of the non-visible light image 650, thereby correcting, fixing, or augmenting the visible light image 600 to result in the hybrid image 900. Accordingly, the resulting hybrid image 900 can have a quality factor that at least matches or exceeds the threshold for an acceptable image.

Figure 10:
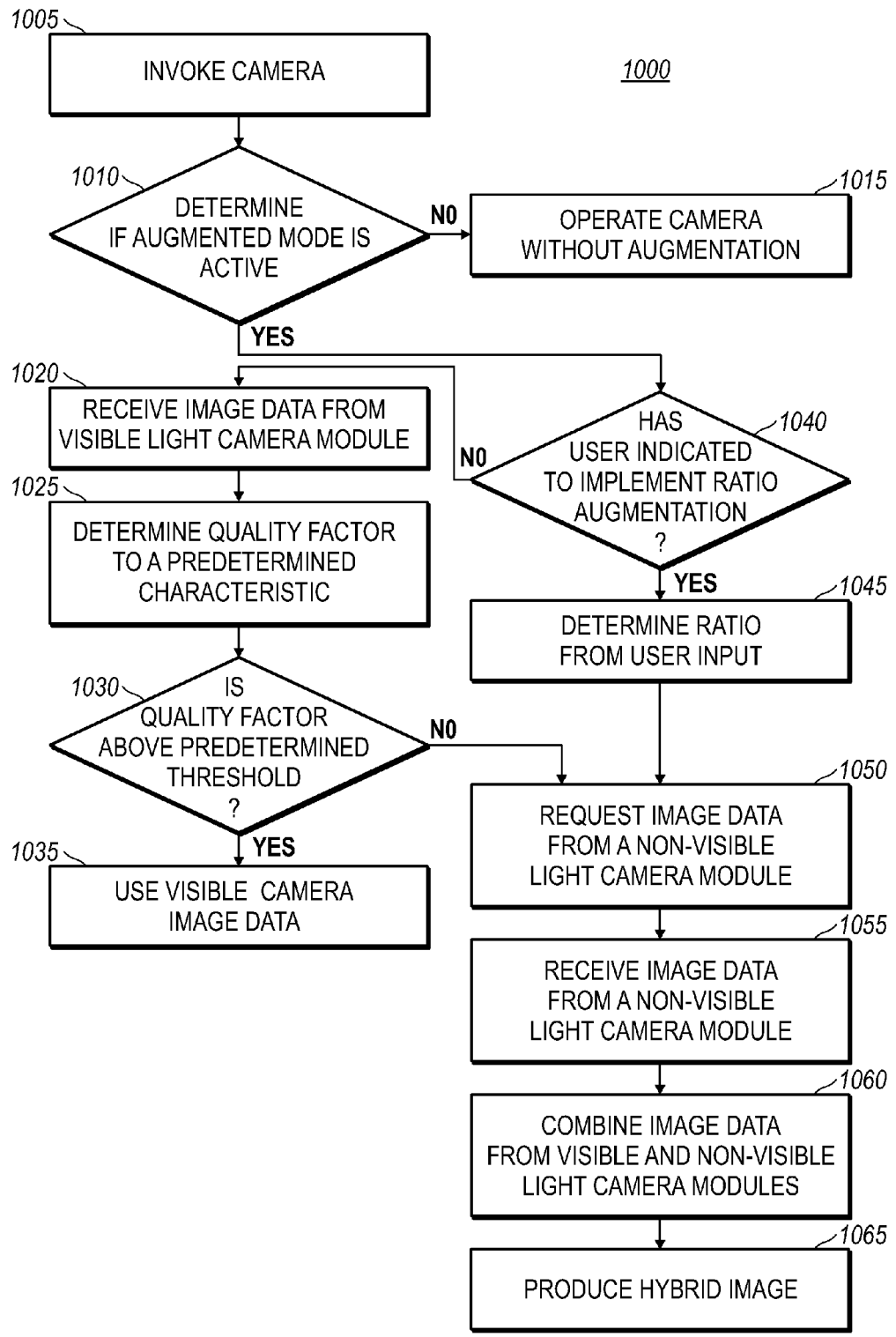
FIG. 10 is a flow chart of a method of adjusting camera image data in accordance with an example implementation.

FIG. 10 is a flow chart of a method of adjusting camera image data received by a mobile device. The method 1000 illustrated in FIG. 10 is provided by way of example, as there are a variety of ways to carry out the method. Additionally, while the example method 1000 is illustrated with a particular order of steps, those of ordinary skill in the art will appreciate that FIG. 10 and the steps illustrated therein can be executed in any order that accomplishes the technical advantages of the present disclosure and can include fewer or more steps than illustrated.

Each block shown in FIG. 10 represents one or more processes, methods or subroutines, carried out in example method 1000. The steps illustrated in FIG. 10 can be implemented in a system including a mobile device 100 such as a smartphone, an electronic tablet, or any other mobile device capable of at least accepting data, transmitting data, and executing commands. Each block shown in FIG. 10 can be carried out by the ISP 205 (which can be one or more processors and/or one or more processing systems) of the mobile device 100 illustrated in FIG. 2 or the application processor 210 (which can be one or more processors or one or more processing systems). The flow chart illustrated in FIG. 10 will be described in relation to and make reference to the mobile device 100 in FIG. 2, the memory device illustrated in FIG. 5, and the images illustrated in FIGS. 6A-9.

The method 1000 can begin at block 1005. At block 1005, the camera of the mobile device 100 can be invoked. For example, the camera (such as, the visible light camera module 110, the non-visible light camera module 115, or both) can be invoked by initiating a camera application. The camera application can allow for capturing still photos or images or a series of pictures, such as videos. In other implementations, the camera can be invoked by a selection of a shortcut key assigned to initiating the camera of the mobile device 100. After the camera is invoked, the method 1000 can proceed to block 1010.

At block 1010, a determination can be made if an augmented mode is active. For example, the determination can be made by one or both of the ISP 205 and the application processor 210. In another embodiment, a different processor, such as a main mobile device processor (not shown), can make the determination. If the augmented mode is not active, the method can proceed to block 1015. In at least one embodiment, the augmented mode can always be active such that the determination block 1010 can be skipped.

At block 1015, the camera of the mobile device 100 can be operated without augmentation. However, if the augmented mode is active, the method can proceed to block 1040.

At block 1040, a determination can be made as to whether augmentation should be implemented. For example, the determination can be made by one or both of the ISP 205 and the application processor 210. In another embodiment, a different processor, such as the main mobile device processor (not shown), can make the determination. This determination can be based on input received by the mobile device from the user, for example, when the user indicates that augmentation should be implemented. Alternatively, augmentation can be implemented unless the user has indicated that augmentation is not desired. The user can indicate that augmentation should be implemented by selecting such an option from a camera setting menu 1305 (shown in FIG. 13). In other embodiments, a notification can be presented on the display requesting the user to select whether augmentation should be implemented when capturing images. If the user has indicated that augmentation should be implemented at a specific ratio, the method can proceed to block 1045. If a specific ratio has not been indicated, the method 100 can proceed to block 1020.

At block 1045, a ratio can be determined from a user input received at the mobile device 100. For example, the determination can be made by one or both of the ISP 205 and the application processor 210. In another embodiment, a different processor, such as the main mobile device processor (not shown), can make the determination. The ratio can indicate the frequency of capturing non-visible light camera image data 650. For example, the frequency of capturing non-visible light camera image data 650 can include capturing one non-visible light camera image data 650 for every other visible light camera image data 600, for every fifth visible light camera image data 600, for every tenth visible light camera image data 505, for every seventh visible light camera image data 600, for every twentieth visible light camera image data 600, for every twenty-fifth visible light camera image data 600, for every fiftieth visible light camera image data 600, for every one-hundredth visible light camera image data 600, for every visible light camera image data, or any other ratio. The non-visible light camera module 115 can remain in the powered-down or low-power state until a non-visible light camera image is captured, since the frequency of non-visible light camera image data capturing is predetermined or preset. When the non-visible light camera module 115 remains in the low-power state or powered-down state until a non-visible light camera image is needed, processing power, processing time, and battery life can be preserved. In other embodiments, the powering of the non-visible light camera module 115 can be as described above. After the ratio is determined, the method can proceed to block 1050 as will be described below.

Blocks 1040 and 1045 can correspond to a user-initiated image augmentation mode. However, the augmentation mode can be automatic or can operate under default settings or automatic settings.

If augmentation is automatically determined or the user has indicated that automatic augmentation should be implemented, the method 1000 at block 1020 receives image data 600 from a visible light camera module 110 of the mobile device 100. The visible light data can be in the form of a raw data frame. The visible light data captured by the visible light camera module 110 can be transmitted to the ISP 205 of the mobile device 100, and the method 1000 can proceed to block 1025. In at least one implementation, the visible light camera image data 600 can be time-stamped to aid in determining a corresponding a non-visible light camera image data 650 for augmenting the visible light camera image data 600, as will be described in further detail below.

At block 1025, a quality factor of the image data 600 from the visible light camera module 110 can be determined based at least on at least one predetermined characteristic. For example, the determination can be made by one or both of the ISP 205 and the application processor 210. In another embodiment, a different processor, such as the main mobile device processor (not shown), can make the determination. For example, the at least one predetermined characteristic can include a sharpness, an exposure time (for example, based on a determination of a level of misalignment for lens exposure time), total exposure time, luminance, whether a pixel of the image data is dead, or other characteristics of images. The quality factor can be a measurement of a predetermined characteristic of the image 600. For example, a sharpness level, a lens exposure time (such as a total exposure time), a brightness measurement, a luminance value, a light intensity measurement, a luminance remittance, a luminous existence, a white balance measurement, a black and white level, a sharpness level, a blurriness level, a color level, a contrast level, or any other measurement of a predetermined characteristic of images may be used. The quality factor can be determined on a pixel by pixel basis, for a portion of the image data 600, or for the entire image data 600. By determining the quality factor of the image on a pixel by pixel basis or on a portion by portion basis, problematic pixels or portions of the image can be identified (for example, as discussed above in relation to FIGS. 6A-8B). The problematic pixels or portions can be indicative of a dead pixel, as described above, or a portion of the image that is a poor image quality. Such identified pixels and portions can then be identified or marked for augmenting as will be described below. After the quality factor of the captured image 600 is determined, the method 1000 can proceed to block 1030.

At block 1030, a comparison of the quality factor to a predetermined threshold can be made. For example, the comparison can be made by one or both of the ISP 205 and the application processor 210. In another embodiment, a different processor, such as the main mobile device processor, can make the comparison. For example, the predetermined threshold can be associated with at least one of the predetermined characteristics. The predetermined threshold can indicate a minimum level or measurement of at least one predetermined characteristic that represents a sufficient or acceptable quality for an image. The minimum level can depend on the predetermined characteristic. Some examples of the minimum level are presented herein, but others can be implemented as well. The minimum level can be user defined. For example, when color uniformity is the quality factor, the minimum level can be a color uniformity of 95% uniformity. In one example, the quality factors can be measured by the ISP. In one example, the ISP can probe selected pixels, groups of pixels, or both selected pixels and groups of pixels in the image data. The ability to perform analysis on the pixel level allows for determination of when the color changes from dark to bright. In another example, when the color changes rapidly, the color change indicates a camera lens exposure time issue, which can be caused from overexposure or underexposure. Thus, when comparing pixel color it can be determined the amount of color change that has occurred at the pixel or group of pixels. The amount of color change can be compared to a predetermined threshold, which in one example is a 10% deviation or a 90% consistency. Additionally, a review of the image histogram can be performed such that the color uniformity is sampled across a plurality of images. In one embodiment, one or more regions are identified for examination and then scanned for uniformity. In one example, the consistency of color should be greater than 98% consistent or have a deviation of less than 2%. At block 1030, the comparison of the quality factor to the predetermined threshold can be a determination as to whether the quality factor is above the predetermined threshold. If the quality factor is above the predetermined threshold, the method can proceed to block 1035.

At block 1035, if the quality factor is above the predetermined threshold, the visible camera image data 600 can be used. For example, the visible camera image data 600 can be transmitted from the ISP 205 to the application processor. That the quality factor is above the predetermined threshold can indicate that the image captured by the visible light camera module 110 is of sufficient or acceptable quality to be used by the application processor (for example, for displaying the image on the display 220 of the mobile device 100).

If, however, the quality factor is not above the threshold, the method can proceed to block 1050. For example, if the quality factor is below or equal to the threshold, the method can proceed to block 1050. At block 1050, a request can be transmitted to obtain image data from a non-visible light camera module 115. For example, the request can be transmitted by the ISP 205. The request can be received by the application processor 210 or any other suitable processor coupled to the non-visible camera light module 115. In response to the request for image data from the non-visible light camera module 115, the method can proceed to block 1055. In other embodiments, the request can be transmitted from a first portion of the ISP 205 to execute a second portion of the ISP 205 to obtain or transmit a command to obtain image data from the non-visible light camera module 115. The non-visible light camera module 115 can be fully powered on in response to the request for non-visible light camera image data. In other implementations, the non-visible light camera module 115 can be powered on while the visible light camera module 110 is powered on. The visible light camera module 110 and the non-visible light camera module 115 can be powered and synchronized with each other such that when one camera module is capturing an image the other camera module is placed in a low-power state or powered off. After the request for image data from the non-visible light camera module 115 is received, the method can proceed to block 1055.

At block 1055, image data can be received from the non-visible light camera module 115. In another implementation, the image data from the non-visible light camera module 115 can be retrieved from a memory device 215 which stores image data captured by the non-visible light camera module 115, as discussed above in relation to FIG. 5. The non-visible light camera image data 650 can be time-stamped similarly as the visible light camera image data 600. The time-stamps of the non-visible light camera image data 650 can serve as an indicator or reference for identifying which non-visible light camera image data 650 corresponds to the visible light camera image data 600. That is, the time-stamps aid in determining which non-visible light camera image data 650 was captured substantially simultaneously when a visible light camera image data 600 was captured. In other words, the time-stamps can link the visible light camera image data 600 to a corresponding non-visible light camera image data 650 that is likely to have a substantially similar scene as that captured in the visible light camera image data 600. Receiving image data from the non-visible light camera module 115 can also be received at a predetermined ratio (as described above in relation to FIG. 5 and as discussed in relation to Block 1045) to the visible light camera module 110. For example, one non-visible light camera image data 650 can be captured or received for every four visible light camera image data captured or received. Other ratios as described above can also be implemented. After the non-visible light camera image data 650 is received, the method can proceed to block 1060.

At block 1060, the visible light camera image data 600 and the non-visible light camera image data 650 can be combined, augmented, or both combined and augmented. For example, the combination, augmentation, or both the combination and augmentation can be made by one or both of the ISP 205 and the application processor 210. In another embodiment, a different processor, such as the main mobile device processor, can make the combination, augmentation, or both the combination and augmentation. For example, as discussed above, the problematic or low quality pixels or portions of the visible light camera image data 600 that are identified at blocks 1025 and 1030 can be combined with corresponding pixels or portions of the non-visible light camera image data 650. As described above, the visible light camera image data 600 can be combined with the non-visible light camera image data 650 on a pixel-by-pixel basis, a portion-by-portion basis, or can be overlapped such that the dead or low-quality pixels of the visible light camera image data 600 are filled in or replaced with the corresponding pixels of the non-visible light camera image data 650.

In another example, non-visible light image data can be used to improve image quality, using "Histogram Blocks," of the visible light image. When the visible light camera 110 captures images, the image data can be stored in the memory 215 as described above. Additionally, the present method can analyze image characteristics of the visible light image data over time. For example, the memory 215 can be scanned across time for inconsistencies such as contour blurriness, pixel color flickering, or color non-uniformity. In one embodiment, three scans can be performed substantially in parallel. The three scans can be: 1) a scan for pixel consistency with respect to frame histogram (e.g., where a predetermined threshold can be 95%), 2) a scan for pixel accuracy or quality can be measured with the respect to the other surrounding pixels, and 3) a scan for dynamic range swings over time (e.g., where the threshold is a predetermined number of dynamic range swings from minimum to maximum). After combining the visible light camera image data 600 and the non-visible light camera image data 650, the method can proceed to block 1065.

At block 1065, a hybrid image can be produced. For example, the production can be made by one or both of the ISP 205 and the application processor 210. In another embodiment, a different processor, such as the main mobile device processor, can make the production. For example, the hybrid image 900 can be formed from the visible light camera image data 600 and the non-visible light camera image data 650. The hybrid image 900 can be stored in the memory device 215 of the mobile device 200. In other implementations, the hybrid image 900 can be displayed on a display 220 of the mobile device 100.

Figure 11:
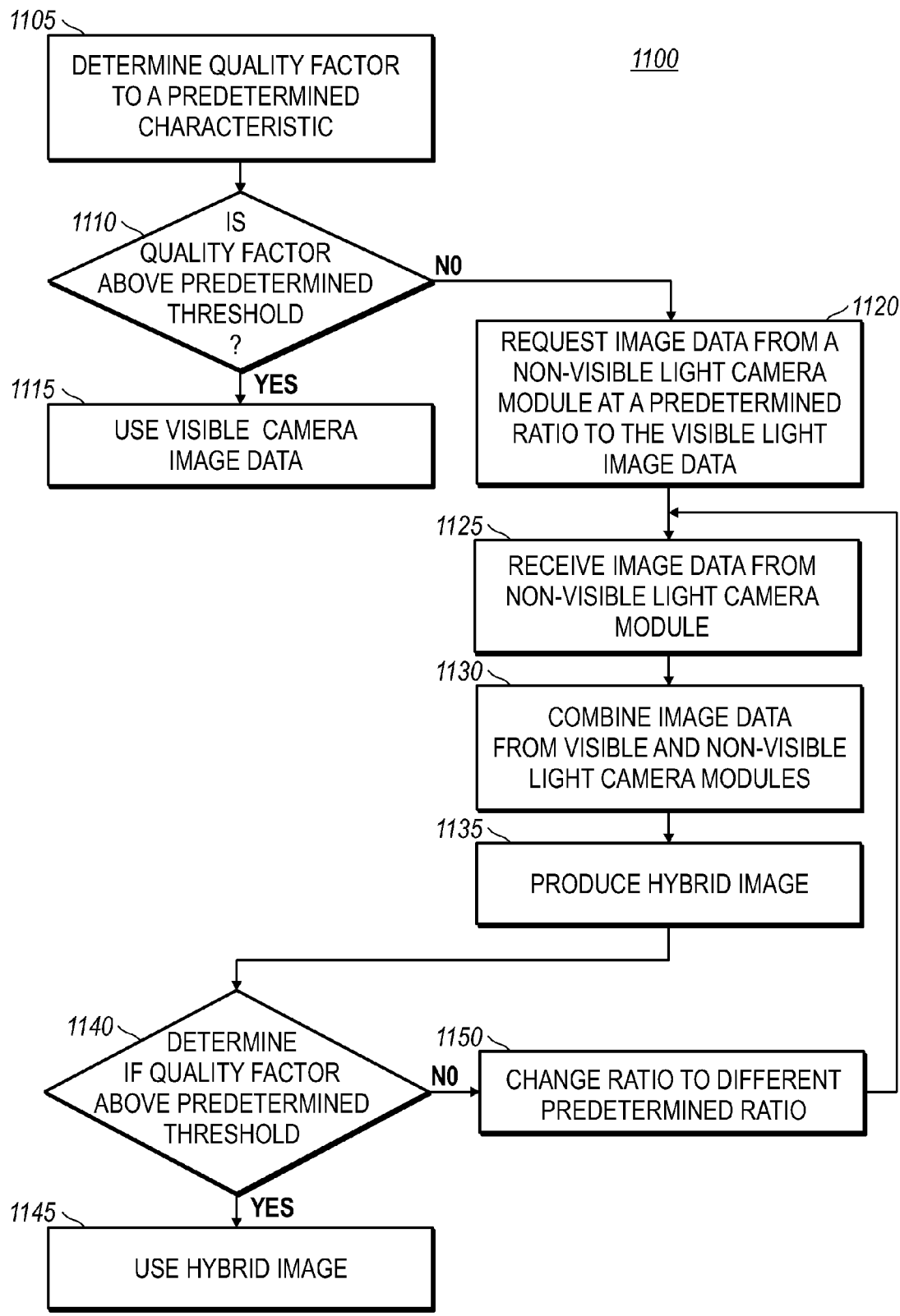
FIG. 11 is a flow chart of another method of adjusting camera image data in which a quality factor of the hybrid image is determined.

FIG. 11 illustrates a flow chart of another implementation of a method 1100 of adjusting camera image data captured by a mobile device 100. Blocks 1105-1135 of FIG. 11 are substantially similar to blocks 1025-1035 and 1050-1065, respectively. FIG. 11 differs from FIG. 10 in that FIG. 11 includes the additional step of determining a quality factor of the hybrid image, at block 1140.

At block 1140, the ISP 205 can determine the quality factor of the hybrid image 900. For example, the determination can be made by one or both of the ISP 205 and the application processor 210. In another embodiment, a different processor, such as the main mobile device processor, can make the determination. The quality factor can be similar to that as described in FIG. 10 at block 1030. After the quality factor of the hybrid image 900 is determined, the quality factor can be compared to a predetermined threshold. For example, the predetermined threshold can be the same as the first threshold as described in relation to FIG. 10 or can be a different threshold, such as a second predetermined threshold associated with predetermined characteristics of hybrid images. If the quality factor of the hybrid image 900 is above the predetermined threshold, the method 1100 can proceed to block 1145. In at least one embodiment, the predetermined threshold level can be user defined, both as a part of the initial configuration and dynamically as images are acquired. The user inputted threshold can be written to an ISP register (not shown) such that the ISP register contains the current threshold. In one example, when the threshold of the hybrid image is the same as the threshold of the visible light image, the resultant hybrid image must be of a sufficient quality to have passed the initial analysis of the quality factor. In other instances, it is desirable to change the threshold of the quality factor to be different from the visible light image. For example, the threshold can be lowered since the resultant image is a hybrid image to account for the fact that certain losses of image data can occur during the composition of the hybrid image. In other embodiments, since a hybrid image is composed of the visible light image data and the non-visible light image data, the hybrid image can be held to a higher threshold such that the hybrid image must satisfy more difficult requirements.

In another embodiment, if a maximum picture quality is required, the ISP can periodically change the predetermined threshold levels, provided that the previous predetermined threshold was satisfied. Additionally, in at least one embodiment, after each increase of the predetermined threshold levels, a testing period can be implemented to determine if the new threshold can be met. If the increased value of the predetermined threshold is met, then the increased value becomes the predetermined threshold. In at least one embodiment the testing period can be optional. For example if there is a need to preserve battery life, having an optional testing period can reduce processing power consumption thereby increasing battery life.

In still another embodiment, a default criteria level or threshold level can be locked-in or unchanged until the user edits the threshold. Such default criteria level can act as an absolute minimum for image quality. If the default criteria level setting further includes a default-selected setting that allows the ISP to independently increase all criteria levels, eventually over time, the ratio between visible light image frames versus hybrid frames can become off-balance, and result in all the images being hybrid images. In such a situation, excessive raw frame or raw image data computation resource requirements can deplete battery life, can cause additional heat dissipation, and can decrease the system's ability to sustain operation.

At block 1145, the hybrid image 900 can be used. For example, the hybrid image 900 can be transmitted to the application processor 210 of the mobile device 100. In one implementation, the hybrid image 900 can be transmitted to the application processor 210 and the application processor 210 can execute instructions to display the hybrid image 900 on the display 220 of the mobile device 100. If, however, the quality factor of the hybrid image 900 is not above the predetermined threshold (for example, is below or is less than or equal to the predetermined threshold), the method can proceed to block 1150.

At block 1150, the ratio of capturing non-visible light camera image data as compared to visible light camera image data (for example, the frequency of capturing non-visible light camera image data) can be changed to a different ratio. For example, the changing of the ratio can be made by one or both of the ISP 205 and the application processor 210. In another embodiment, a different processor, such as the main mobile device processor, can change the ratio. For example, if the quality factor of the hybrid image 900 indicates that the hybrid image is of a poor quality, the ratio of received image data from the non-visible light camera 115 to the visible light camera 110 can be increased. After the ratio is increased, the method can return to block 1125, which corresponds to block 1055 of FIG. 10. In FIG. 11, the method 1100 can cycle through blocks 1125-1150 until the quality factor of the hybrid image 900 satisfies, is above, or is greater than or equal to the predetermined threshold associated with the characteristics of hybrid images.

In another implementation, in response to determining that the quality factor for the hybrid image 900 falls below the predetermined threshold, the image sensor associated with the visible light camera module 110 can be adjusted. For example, a brightness level, a luminance level, a contrast level, an exposure time, a sharpness level, or any other characteristic of the image can be adjusted. That is the image sensor associated with the visible light camera module 110 can be adjusted to account for the poor quality factor of the previously-captured image.

Figure 12:
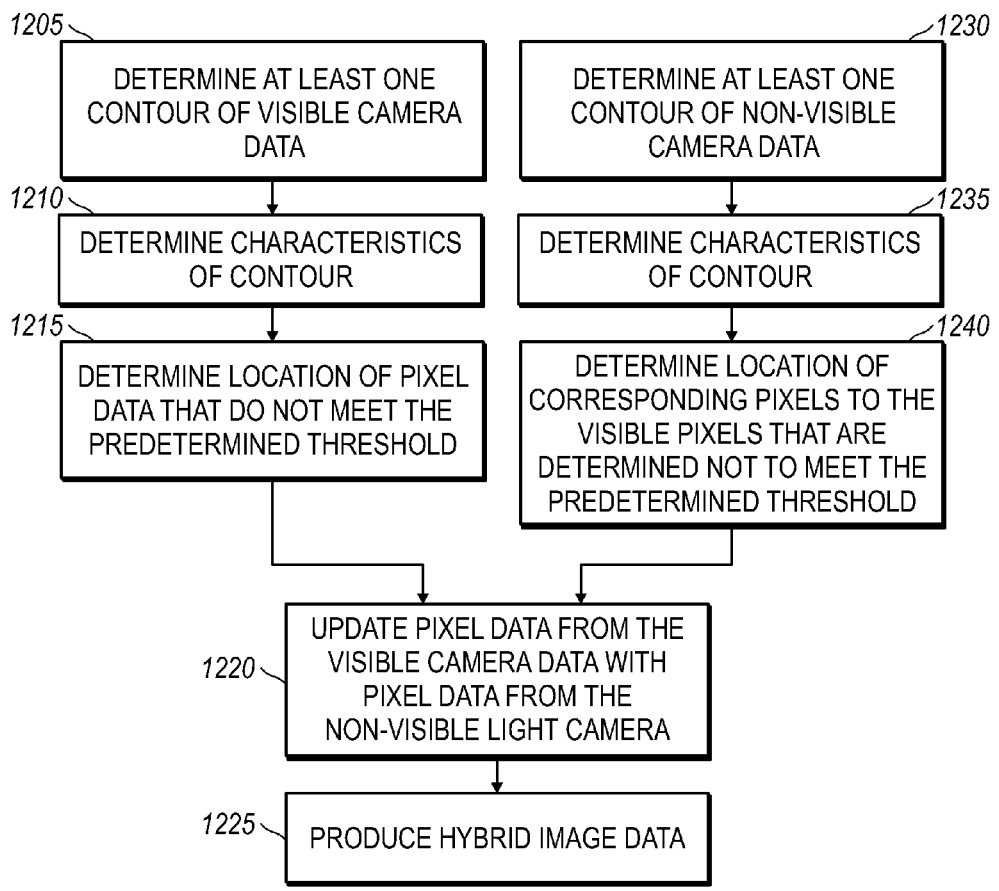
FIG. 12 is a flow chart of an example method of adjusting camera image data in which the contours of the non-visible light camera image data and the visible light camera image data are determined to locate the portion(s) of the visible light camera image data that do not meet a predetermined threshold associated with an acceptable quality factor for images.

FIG. 12 illustrates a flow chart of another implementation of a method of adjusting camera image data. Specifically, FIG. 12 illustrates a flow chart of blocks for producing hybrid image data. The blocks illustrated in FIG. 12 can be included in the methods 1000, 1100 of FIGS. 10 and 11, or can include at least one of the steps therein. In other implementations, the method steps illustrated in FIG. 12 can be included in a method different from those illustrated in FIGS. 10 and 11. For example, the method 1200 of producing the hybrid image illustrated in FIG. 12 can follow block 1055 of FIG. 10 or block 1125 of FIG. 11.

In the specific implementation illustrated in FIG. 12, the method 1200 of producing the hybrid image can be included in block 1060 of FIG. 10 or block 1130 of FIG. 11. That is, combining image data from the visible and non-visible light camera modules, as illustrated in blocks 1060 and 1130 of FIGS. 10 and 11, respectively, can include the steps illustrated in FIG. 12. For example, combining and/or augmenting image data from the visible light and non-visible light camera modules can include block 1205 of FIG. 12. For example, the combination and/or augmentation can be made by one or both of the ISP 205 and the application processor 210. In another embodiment, a different processor, such as the main mobile device processor, can make the combination, augmentation, or both the combination and the augmentation.

At block 1205, a determination of at least one contour of visible light camera image data 600 can be made. For example, determining at least one contour of the visible light camera image data can be performed by the ISP 205 of the mobile device 100. Determining at least one contour of the visible light camera image data 600 can include determining a contour 700 or an outline of an object captured by the visible light camera 110. After determining at least one contour of the visible light camera image data 600, the method can proceed to block 1210.

At block 1210, a determination of the characteristics of the contour 700 can be made. For example, the determination can be made by one or both of the ISP 205 and the application processor 210. In another embodiment, a different processor, such as the main mobile device processor, can make the determination. The determination of the characteristics of the contour can be such that at least two scaling factors are generated for the visible light image data. The scaling factors provide for a determination of the location of a portion of the image data from the contour 700. After the characteristics of the contour 700 have been determined the method can proceed to block 1215.

At block 1215, a determination of the location of data that do not meet a predetermined threshold can be made. For example, the determination can be made by one or both of the ISP 205 and the application processor 210. In another embodiment, a different processor, such as the main mobile device processor, can make the determination. The predetermined threshold can be any predetermined threshold associated with an acceptable quality of an image, as described above. For example, the predetermined threshold can be a minimum level of image sharpness, a minimal level of misalignment for less exposure time, a minimum level of luminous existence, a minimum contrast level, or any other predetermined threshold associated with characteristics of pixels of an image having an acceptable quality. The location of the pixel data that do not meet the predetermined threshold can be determined based at least in part on measurements from the at least one contour of the image data from the visible light camera module 110. For example, the location of the visible pixels that do not meet the predetermined threshold can be determined by triangulating the location of the visible pixels from points on the contour 700. That is, a first vector 805 can be drawn from a first point 815 on the contour 700 to the pixel(s) that do not meet the predetermined threshold, as illustrated in FIG. 8A. A second vector 810 can be drawn from a second point 820 on the contour 700 to the pixel(s) that do not meet the predetermined threshold. Based on the first vector 805 and the second vector 810, the location of the pixel(s) that do not meet the predetermined threshold can be approximated. The magnitude and direction of the first vector 805 and the second vector 810 can be determined and used to determine a location in the non-visible light camera image 650 that corresponds to the visible light pixel(s) that do not meet the predetermined threshold, as will be discussed below. After the determination of the location of the pixel data, the method can proceed to block 1230.

At block 1230, a determination of at least one contour of the non-visible light camera image data can be made. For example, the determination can be made by one or both of the ISP 205 and the application processor 210. In another embodiment, a different processor, such as the main mobile device processor, can make the determination. In another implementation, the determination can be made in parallel, substantially simultaneously, or concurrently with the determination of the contour of the visible light camera image data at block 1205. Specifically, at block 1230, determining at least one contour of the non-visible light camera image data 650 can include determining a contour 750 or an outline of an object captured by the non-visible light camera 115. After determining at least one contour of the non-visible light camera image data 650, the method can proceed to block 1235.

At block 1235, a determination of the characteristics of the contour 650 of the non-visible light camera image data 650. For example, the determination can be made by one or both of the ISP 205 and the application processor 210. In another embodiment, a different processor, such as the main mobile device processor, can make the determination. The determination of the characteristics of the contour 650 can be such that at least two scaling factors are generated for the non-visible light image data. The scaling factors along with the scaling factors and vectors of the visible light image data provide for a determination of the location of a portion of the non-visible image data corresponding to the portion of the visible light image data that is below the predetermined quality factor. After the characteristics of the contour 750 have been determined the method can proceed to block 1240.

At block 1240, the location of non-visible light pixels (for example, corresponding pixels or corresponding non-visible light pixels) that correspond to the visible pixels that do not meet the predetermined threshold can be determined. For example, the determination can be made by one or both of the ISP 205 and the application processor 210. In another embodiment, a different processor, such as the main mobile device processor, can make the determination. For example, a corresponding portion the non-visible light image 650 associated with the non-visible light pixels that correspond to the visible pixels that do not meet the predetermined threshold can be located based on a comparison of the at least one contour of the image data from the visible light camera module and the at least one contour of the image data from the non-visible light camera module. In at least one implementation, the first vector 805 and the second vector 810 can be used to find the location of the non-visible light pixels that correspond to the visible light pixels that do not meet the predetermined threshold. For example, the magnitude and direction of the first vector 805 and the second vector 810 associated with the visible light camera image data 600 can be used to draw substantially similar vectors (for example, a third vector 855 and a fourth vector 860) using the scaling factors from the contour of the non-visible light camera image 650. Based on the direction and the magnitude of the first vector 805 and the second vector 810 associated with the visible light camera image 600, a third vector 855 and a fourth vector 860 of corresponding direction and magnitude (for example based on a ratio of the resolution of the non-visible light camera image 650 to the resolution of the visible light camera image 600) can be determined. The corresponding non-visible light image pixels can then be triangulated from a third point 865 and a fourth point 870 on the contour 750 of the non-visible light camera image 650 that correspond to first point 815 and the second point 820 of the contour 800 of the visible camera image 600 using the third vector 850 and the fourth vector 860 of the non-visible light camera image 650, as illustrated in FIG. 8B. After the location of the corresponding non-visible light pixels is determined, the method can proceed to block 1220.

At block 1220, the pixel data from the visible light camera image data can be updated with the pixel data from the non-visible light camera image data. For example, the updating can be made by one or both of the ISP 205 and the application processor 210. In another embodiment, a different processor, such as the main mobile device processor, can make the updating. Updating the pixel data of the visible light camera image data 600 with the non-visible light camera image data 650 can include replacing the pixel data of the visible light camera image data 600 that do not meet the predetermined threshold with the corresponding pixel data from the non-visible light camera image data 650. In another implementation, updating the pixel data of the visible light camera image data 600 can include replacing a portion of the visible light camera image data 600 associated with the pixels that do not meet the predetermined threshold with a corresponding portion of the non-visible light camera image data 650 that include the non-visible light pixels that correspond to the visible light pixels that do not meet the predetermined threshold. The pixel content manipulation of augmentation can include changing an intensity of red, green and blue values based on the ISP's assessment of image quality, as described above. After the pixel data from the visible light camera image data 600 is updated, the method can proceed to block 1225.

At block 1225, hybrid image data can be produced. For example, the production can be made by one or both of the ISP 205 and the application processor 210. In another embodiment, a different processor, such as the main mobile device processor, can make the production. The hybrid image data 900 can be produced by recording or storing the visible light camera image data updated in a hybrid portion 405 of the memory device 215. In another implementation, producing hybrid image data 900 can include creating a new image file comprising the visible light camera image data 600 updated with the corresponding pixels of the non-visible light camera image data 650 and saving the new image file in the memory device 215.

While FIG. 12 is described as determining the contours of the non-visible light camera image data 650 and the visible light camera image data 600, in another implementation, at least one contour of a previous hybrid image can be determined. A determination that at least one portion of the image data from the visible camera module 110 is outside of an acceptable threshold for image quality can be made. The location of the at least one portion of the image data from the visible light camera image data 600 that is outside the acceptable threshold can be determined based on measurements from at least one contour of the image data from the visible light camera module, for example by triangulating the location of the portion based on vectors drawn from the at least one contour. A portion of the image data from the non-visible light camera module 115 and the image data from the previous hybrid image that corresponds to the portion of the image data from the visible light camera image data 600 can be determined, for example by drawing vectors of substantially similar magnitude and direction as those determined for the visible light camera image data 600 from contours of objects in the non-visible light image data 650 and the previous hybrid image data. The visible light image camera image data 600 can be updated with the image data from at least one of the non-visible light camera module 115 or the previous hybrid image at the corresponding portion. In another implementation, a portion of the visible light image camera image data 600 can be updated with a corresponding portion of the non-visible light camera image data 650 or the previous hybrid image at the corresponding portion, or a combination thereof.

In any one of the methods illustrated in FIGS. 10-12, the augmentation (such as the combination of the non-visible light camera image data and the visible light camera image data or the updating of the visible light camera image data) can be a looping process. For example, the augmentation can continue looping until the visible light camera image data has a quality factor that satisfies, exceeds, or is greater than the predetermined threshold.

Figure 13:
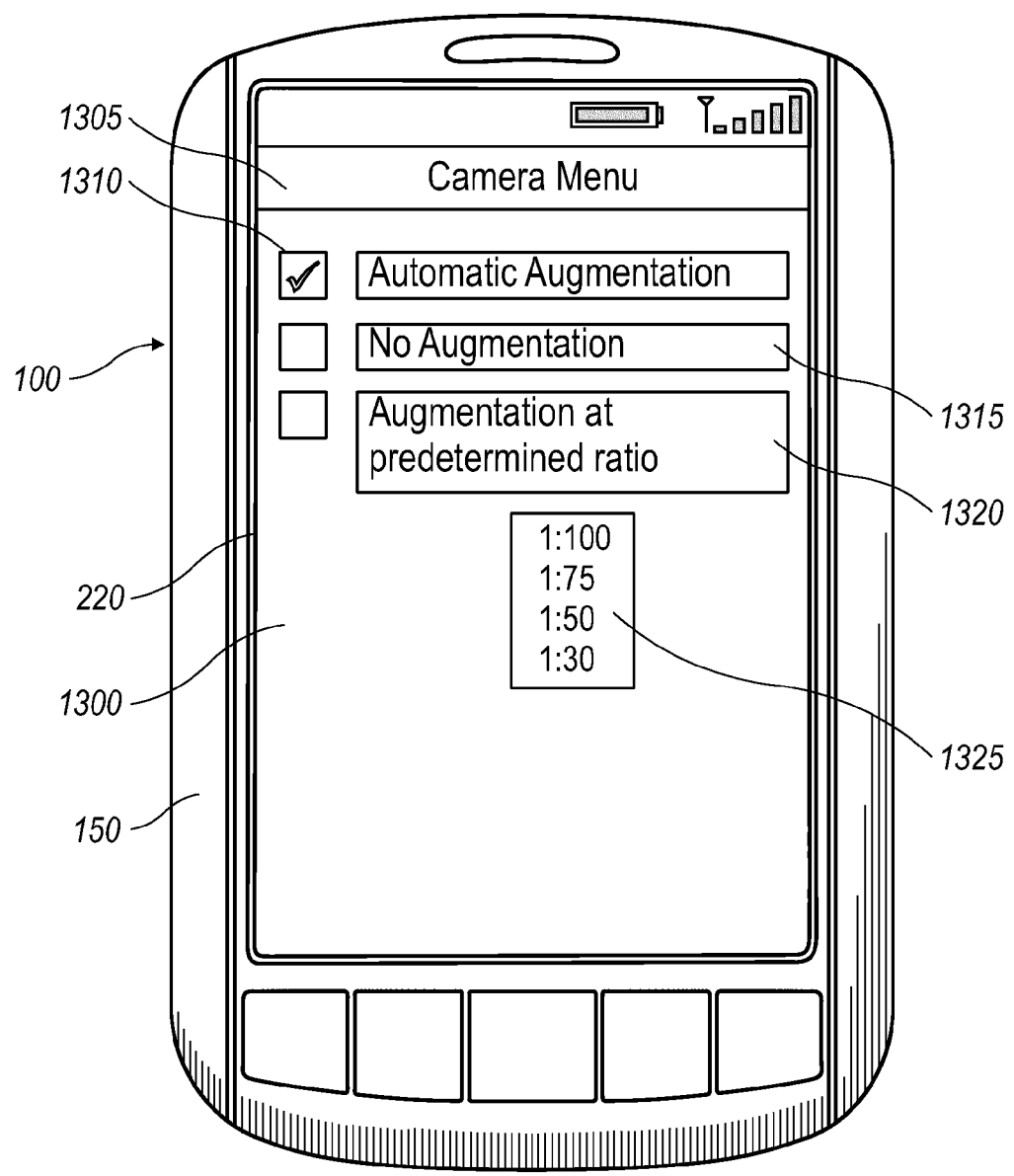
FIG. 13 is an illustration of a front view of an example mobile device wherein an exemplary camera setting menu, in which augmentation or adjusting of camera image data can be user-selected or user-defined, is shown on the display.

While the methods presented above can be described as a camera augmentation mode or an assistive mode that is automatic, the augmentation mode can be user-enabled. For example, by making selections on a device as illustrated in FIG. 13. FIG. 13 illustrates a front 150 of a mobile device 100. The display 220 of the mobile device 105 can display user interface 1300. In FIG. 13, user interface 1300 can be associated with a camera application and can include a camera menu 1305. The camera menu 1305 can include a plurality of settings which can be designated or selected to enable an augmentation mode, such as those described above. Specifically, the camera menu 1305 can include a setting for automatic augmentation 1310, a setting for no augmentation 1315, and a setting for user-defined augmentation 1320.

In FIG. 13, the setting for automatic augmentation 1315 is selected. As the setting for the automatic augmentation 1315 is selected, the ISP 205 can be set to a mode to automatically determine whether each visible light camera image data is outside of predetermined thresholds associated with characteristics of images having acceptable quality factors and can automatically augment the visible light camera image data with non-visible light camera image data. In such a mode, the frequency that the non-visible light camera image data is received can be dynamically adjusted based on the determined quality factor of the received visible light camera image data. That is, if the received visible light camera image data falls below a predetermined threshold associated with quality factors by a small amount, the frequency of capturing non-visible light camera image data can be less frequent. Alternatively, if the received visible light camera image data falls below the predetermined threshold by a large amount, the frequency of capturing non-visible light camera image data can be more frequent.

If the setting for no augmentation 1315 is selected, no augmentation will be applied to the visible light camera image data. That is, the visible light camera image data 600 will not be augmented by the ISP 205 and will be transmitted to the application processor 210 for display on the display 220 of the mobile device 100.

If the setting for a user-defined augmentation 1320 is selected, augmentation will applied to the visible light camera image data based on the user-defined settings associated with augmentation 1325. For example, as illustrated in FIG. 13, the user-defined settings associated with augmentation 1325 can include selecting a frequency of capturing or receiving non-visible light camera image data 650. The frequency of capturing receiving non-visible light camera image data 650 can be represented as a ratio, as illustrated in FIG. 13. The ratio can indicate a number of non-visible light camera image data 650 captured in comparison to a number of visible light camera image data 600 captured. For example, in FIG. 13, the ratios can include: 1:100 (one non-visible light camera image data captured for every 100 visible light camera image data), 1:75 (one non-visible light camera image data captured for every 75 visible light camera image data), 1:50 (one non-visible light camera image data captured for every 50 visible light camera image data), 1:30 (one non-visible light camera image data captured for every 30 visible light camera image data), or any other ratio. In other implementations, the user-defined settings can include a maximum and a minimum number of visible light images captured for every non-visible light camera image.

Examples within the scope of the present disclosure may also include tangible, non-transitory computer-readable storage media, or both tangible and non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Implementations herein can include the execution of computer-executable instructions of the method steps described in FIGS. 10-12. For example, computer-executable instructions can include instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various implementations described above are non-limiting examples. For example, the principles herein apply not only to a smartphone device but to other devices capable of receiving communications such as a laptop computer. Various modifications and changes that can be made according to the principles described herein without departing from subject matter of the following claims.

What is claimed is:

1. A method for adjusting camera image data comprising:
    determining a quality factor of image data generated by a visible light camera module based on at least one characteristic;
    comparing the quality factor to a first threshold;
    receiving non-visible light image data from a non-visible light camera module at a predetermined ratio to image data from the visible light camera module;
    augmenting the image data from the visible light camera module with the non-visible light image data generated by the non-visible light camera module to generate hybrid image data when the quality factor is below the first threshold; and
    determining a quality factor of the hybrid image data based on at least one predetermined characteristic of the hybrid image data and increasing the ratio when the quality factor is below a second predetermined threshold.

2. The method as recited in claim 1, wherein the non-visible light camera module is at least one of an infrared camera module and an ultraviolet camera module.

3. The method as recited in claim 1, further comprising adjusting an image sensor associated with the visible light camera module in response to a determined image quality of the hybrid image data.

4. The method as recited in claim 1, wherein augmenting the image data comprises determining at least one contour from the image data from the visible camera module and the non-visible light image data from the non-visible light camera module.

5. The method as recited in claim 4, further comprising determining that at least one portion of the image data from the visible camera module is outside of an acceptable threshold for image quality.

6. The method as recited in claim 5, further comprising determining the location of the at least one portion of the image data based on measurements from the at least one contour.

7. The method as recited in claim 6, further comprising determining a corresponding portion of the non-visible light image data from the non-visible light camera module based on a comparison of the at least one contour of the image data from the visible light camera module and the at least one contour of the non-visible light image data from the non-visible light camera module.

8. The method as recited in claim 6, further comprising:
    determining at least one contour of a previous hybrid image;
    determining a corresponding portion of the previous hybrid image based on measurements from the at least one contour of the image data from the visible light camera and the at least one contour of the previous hybrid image;
    updating the at least one portion of the image data from at least one of the visible camera module with the non-visible light image data from the non-visible light camera module and the previous hybrid image at the corresponding portion.

9. The method as recited in claim 7, further comprising updating the at least one portion of the image data from the visible camera module with the non-visible light image data from the non-visible light camera module at the corresponding portion.

10. The method as recited in claim 1, wherein the image data received from the visible light camera module is in the form of a raw data frame.

11. The method as recited in claim 1, wherein the at least one characteristic is one of image sharpness, exposure time comparison, and luminous existence characteristic.

12. The method as recited in claim 1, wherein the at least one characteristic is an image sharpness characteristic and the determination is based on a determination that a minimum level of image sharpness is detected.

13. The method as recited in claim 1, wherein the at least one characteristic is an exposure time comparison characteristic and the determination is based upon a determination of a level of misalignment for lens exposure time exceeding a predetermined level.

14. The method as recited in claim 13, wherein the predetermined level is user defined.

15. The method as recited in claim 1, wherein the predetermined characteristic is a luminous existence characteristic and the determination is based on a determination that a minimum level of luminous existence is detected.

16. The method as recited in claim 1, wherein the non-visible light camera module and visible light camera module are powered and synchronized with each other.

17. A system comprising:
    a visible light camera module;
    a non-visible light camera module;
    a processor communicatively coupled to the visible light camera module and the non-visible light camera module; and
    a non-transitory computer readable storage medium storing instructions for controlling the processor to perform steps comprising:
        determining a quality factor of image data generated by a visible light camera module based on at least one characteristic;
        comparing the quality factor to a first threshold;

receiving non-visible light image data from a non-visible light camera module at a predetermined ratio to image data from the visible light camera module;

augmenting the image data from the visible light camera module with the non-visible light image data generated by a non-visible light camera module to generate hybrid image data when the quality factor is below the first threshold; and determining a quality factor of the hybrid image data based on at least one predetermined characteristic of the hybrid image data and increasing the ratio when the quality factor is below a second predetermined threshold.

18. The system of claim 17, wherein:

the visible light camera module comprises an image sensor; and the non-transitory computer readable storage medium comprises further instructions for controlling the processor to perform the step of adjusting the image sensor associated with the visible light camera module in response to a determined image quality of the hybrid image data.

19. A non-transitory computer readable medium storing instructions that are executable to:

determine a quality factor of image data generated by a visible light camera module based on at least one characteristic;

compare the quality factor to a first threshold;

receive non-visible light image data from a non-visible light camera module at a predetermined ratio to image data from the visible light camera module;

augment the image data from the visible light camera module with the non-visible light image data generated by the non-visible light camera module to generate hybrid image data when the quality factor is below the first threshold; and determine a quality factor of the hybrid image data based on at least one predetermined characteristic of the hybrid image data and increasing the ratio when the quality factor is below a second predetermined threshold.

20. The non-transitory computer readable medium of claim 19, further storing instructions that are executable to adjust the image sensor associated with the visible light camera module in response to a determined image quality of the hybrid image data.

\* \* \* \* \*